United States Patent [19]

Kershaw et al.

[11] Patent Number: 5,561,476

[45] Date of Patent: Oct. 1, 1996

[54] MOTION DETECTION METHOD AND APPARATUS

[75] Inventors: Natalie L. Kershaw, Glebe; William C. Naylor, Jr., Mount Kuring-gai; Mark Pulver, Enmore; David R. Brown, East Roseville, all of Australia

[73] Assignee: Canon Inc., Tokyo, Japan

[21] Appl. No.: 528,209

[22] Filed: Sep. 12, 1995

Related U.S. Application Data

[62] Division of Ser. No. 420,716, Apr. 11, 1995, Pat. No. 5,481,319, which is a continuation of Ser. No. 177,310, Jan. 4, 1994, abandoned.

[30] Foreign Application Priority Data

Jan. 11, 1993 [AU] Australia ................... PL 6760

[51] Int. Cl.$^6$ .................. G09G 3/36; H04N 7/18
[52] U.S. Cl. .............. 348/699; 345/100; 348/700; 348/701; 348/415
[58] Field of Search ................... 348/154, 155, 348/402, 407, 413, 415, 416, 699, 700, 701; 345/98, 100; H04N 7/18; G09G 3/36

[56] References Cited

U.S. PATENT DOCUMENTS 4,288,815   9/1981   Miles ........................... 348/701
4,691,230   9/1987   Kaneko et al. ................ 348/699
5,043,807   8/1991   Rabii ............................ 348/699
5,099,322   3/1992   Gove ............................ 348/700
5,151,945   9/1992   Lee .............................. 348/155

FOREIGN PATENT DOCUMENTS 2640452   6/1990   France .
3118675   5/1991   Japan .

Primary Examiner—Howard W. Britton
Attorney, Agent, or Firm—Fitzpatrick, Cella, Harper & Scinto

[57] ABSTRACT

Display standards in common use for the display of computer or television images on high resolution displays, commonly assume that the output image will be displayed on an output device having a high refresh rate. A high refresh rate is normally required so the viewer does not observe flicker, stilted motion or other visual artifacts if a lower refresh rate were used. It is difficult to drive some displays at a high refresh rate. An apparatus is disclosed for detecting areas of an input image that are changing over time, even where the input image may be subject to some degree of noise. A priority value is determined for providing a measure of this change for use with a system to determine which areas of the image may need changing as a matter of high priority.

9 Claims, 20 Drawing Sheets

MOTION DETECTION METHOD AND APPARATUS

This application is a division of application Ser. No. 08/420,716, filed Apr. 11, 1995, now U.S. Patent No. 5,481,319, which is a continuation of application Ser. No. 08/177,310, filed Jan. 4, 1994, now abandoned.

FIELD OF THE INVENTION

The present invention relates to the display of images on a colour display apparatus such as colour computer displays and, in particular, to the display of colour images on a raster colour display apparatus.

DESCRIPTION OF THE RELATED ART

The display of images on devices such as Cathode Ray Tubes (CRT) and twisted nematic-type liquid crystal displays (LCD) is a known art. High resolution colour CRT or LCD display devices in common use for the display of images are capable of displaying in the order of 1024 lines with 1280 pixels on each line with each pixel consisting of red, green and blue components contributing to the intensity level of that pixel on the surface of the CRT. Additionally, common standards in use assume a refresh rate generally above 25 Hz and commonly 60 Hz.

The image is formed on the particular display by utilizing the persistence on a fluorescent screen (CRT) or utilizing a transmittance change of a crystal element (LCD). The impression made by the light received by the eye from the screen persists for a small fraction of a second after the source is removed. In presenting many frames to the eye over each second, the eye integrates between each frame and there is created an illusion that the images are being displayed in a continuous fashion. To create the illusion of motion, sufficient complete frames must be shown during each second so that the eye will continually integrate between them. This effect can normally be produced by having a picture repetition rate greater than about 16 frames per seconds.

The rate of 16 frames per second, however, is not rapid enough to allow the brightness of one picture to blend smoothly into the next when the screen is darkened in between frames. At this rate the screen will appear to 'flicker' if the image written on the screen does not have a long 'persistence' between frames. In a common CRT type screen, the persistence normally lasts for only a very short interval and decays very rapidly before it is written again by the next frame which is to be displayed. In an LCD type display, the element is often chosen to have a relatively short response time to also simulate the effect of a CRT with a short persistence. Hence these devices often produce flicker if used at a low refresh rate.

It has been found that a picture repetition rate of 30 frames per second may not be rapid enough to overcome flicker at the light levels produced by a CRT screen. One common method adopted to overcome this problem is interleaving or interlacing, whereby, different portions of the image are displayed in an interleaved nature. However, this method does not overcome a fundamental problem in that as the number of pixels to be displayed is increased, the time available for the display of each pixel becomes increasingly limited. For example, in the case of a system with a 1280 (lines)×1024 pixels display and a frame frequency of 30 Hz, the time to display a single pixel, ignoring any horizontal or vertical retrace time, is approximately:

$$\text{pixel time} = \frac{1}{1280 \text{ lines} \times 1024 \text{ pixels} \times 30 \text{ hz}}$$
$$= 25.4 \text{ nanoseconds}$$

As this is the maximum time available to change the colour value of a particular pixel, the colour displayed by each pixel element must be capable of being changed within this short time if the display is to faithfully reproduce an intended input image which is subject to change over time.

This interval is extremely short and, if the resolution of the display device is increased, the period becomes even shorter. For example, an increase of resolution to 1920 lines×2560 pixels would result in a time to display each pixel being reduced to about 6.78 nanoseconds. The response time of each pixel of the display device must be able to keep up with this shortened time. One known method of reducing the update speed requirements is to update whole line of pixels at the same time, however it has been found in practice that the update time is again insufficient.

In recent years, Clark and Lagerwall have proposed a ferroelectric liquid crystal device (FLCD) having a high speed responsive characteristic and a memory characteristic. U.S. Pat. No. 4,964,699 (Inoue) entitled 'Display Device', proposes a ferroelectric liquid crystal element display device (FLCD). However, it has been found in practice that, for the higher resolution required of modem computer and television displays, the response time of the ferroelectric element is insufficient to enable a high-speed ferroelectric display to display images at standard rates and resolutions such as the NTSC standard rate or even rates lower than this standard. This problem is accentuated when the resolution of the display is increased.

In relation to the memory characteristics of the ferroelectric form of display, it has been further found that the pixel elements can maintain their state for a substantial period of time after being set to a particular state. Although this period of time can vary in practice, periods up to several hours have been measured, with displays with persistence levels in the order of minutes being produced.

In order to utilize the display having a memory characteristic to display an image having a high refresh rate, it is desirable to be able to detect changes in subsequent frames of an input image in order to obtain a measure of those areas of the input image that have changed and should be updated as a matter of high priority, especially where the input image may contain noise which would lead to changes from frame to frame which do not necessarily reflect changes in the true input image.

It is an object of the present invention to provide a means for detecting motion in an input image, especially in the presence of noise.

SUMMARY OF THE INVENTION

In accordance with one aspect of the present invention, there is provided a motion detection apparatus for use with an input image having a plurality of lines and a plurality of pixels on each line, said apparatus comprising:

average measurement means adapted to add the value of pixels within at least one first region of a given line to form a region summation and to output the summation at the end of said first region to a signature determination means; and edge measurement means comprising pixel difference means adapted to measure a multitude of difference measures between portions of neighbouring pixels in at least one second region and to forward the absolute values of said difference measures to one of a plurality of storage bins, said storage bins being adapted to receive said absolute value of said difference measures and to determine a new maximum current value being the maximum of a previous current value and said absolute value; wherein said signature determination means is connected to said average measurement means and to said edge measurement means and is adapted to receive a set of determination values comprising said maximum values from said edge measurement means for each of said second regions of a line, and said summation from said average measurement means from said second regions of a line, and to determine a priority value from said determination values and a previously stored set of determination values from a previous input image frame, and storing said determination values.

In accordance with another aspect of the present invention, there is provided a method for detecting motion between adjacent frames of an input image that comprises a plurality of lines, each line comprising a plurality of pixels, said method comprising the steps of:

determining an average value of a first region of a line of pixels;

determining a multitude of edge values between neighbouring pixels of a second region of said line of pixels;

forwarding said edge values to a multitude of bins, determining a maximum bin value for said second region for each bin from said edge values; and determining a priority value from said average value and a corresponding average value from a previous frame and said maximum bin values and corresponding maximum bin values from a previous frame.

BRIEF DESCRIPTION OF THE DRAWINGS

A preferred embodiment of the present invention will now be described with reference to the accompanying drawings in which.

DESCRIPTION OF THE PREFERRED EMBODIMENT

In the preferred embodiment, a method and apparatus is provided to determine the priority of changing a particular line by providing two measurements of possible changes, being a measurement of the pixel values of a region of a line, and a measurement of the differences between neighbouring pixel values for other regions of a line, to thereby produce a priority value based on these measurements and previous similar measurements.

Figure 1:
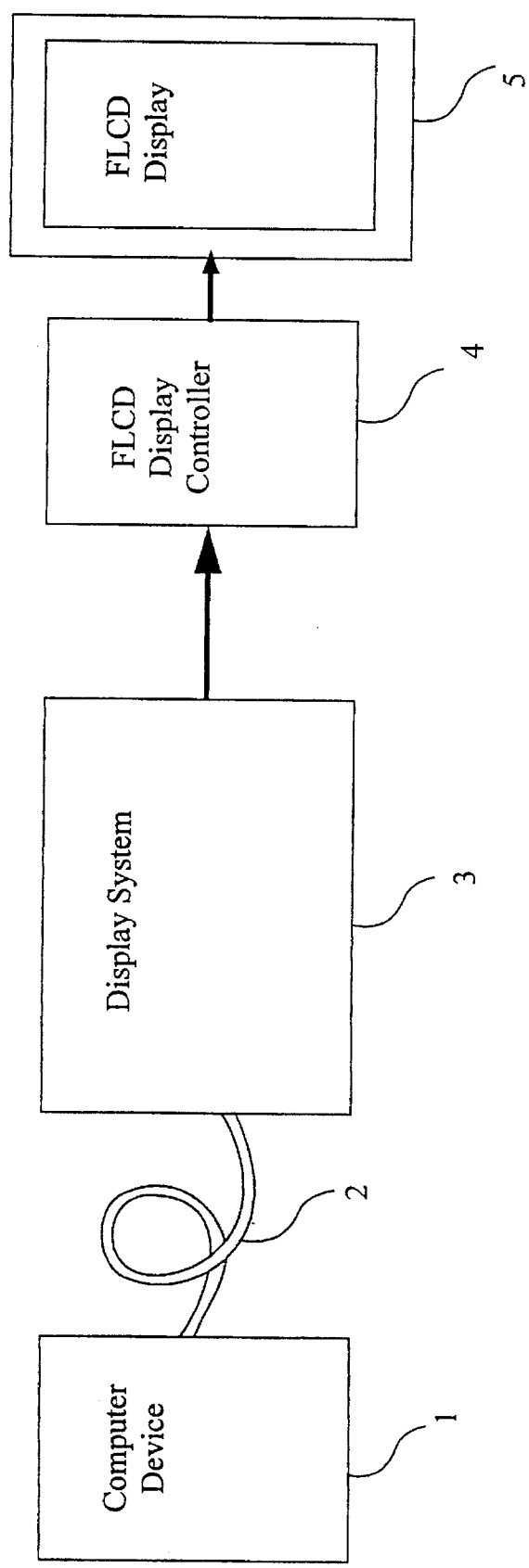
FIG. 1 is a schematic block diagram representation of a display arrangement incorporating the preferred embodiment of the present invention.

Referring now to FIG. 1, a display system 3 is shown configured for receiving an image output in the form of separate colour channels of red, green and blue image information as well as synchronization information from a device 1, such as a computer, via a cable 2 and displaying it on a display, device 5, having a lower frame rate than that expected by the device 1.

Figure 2:
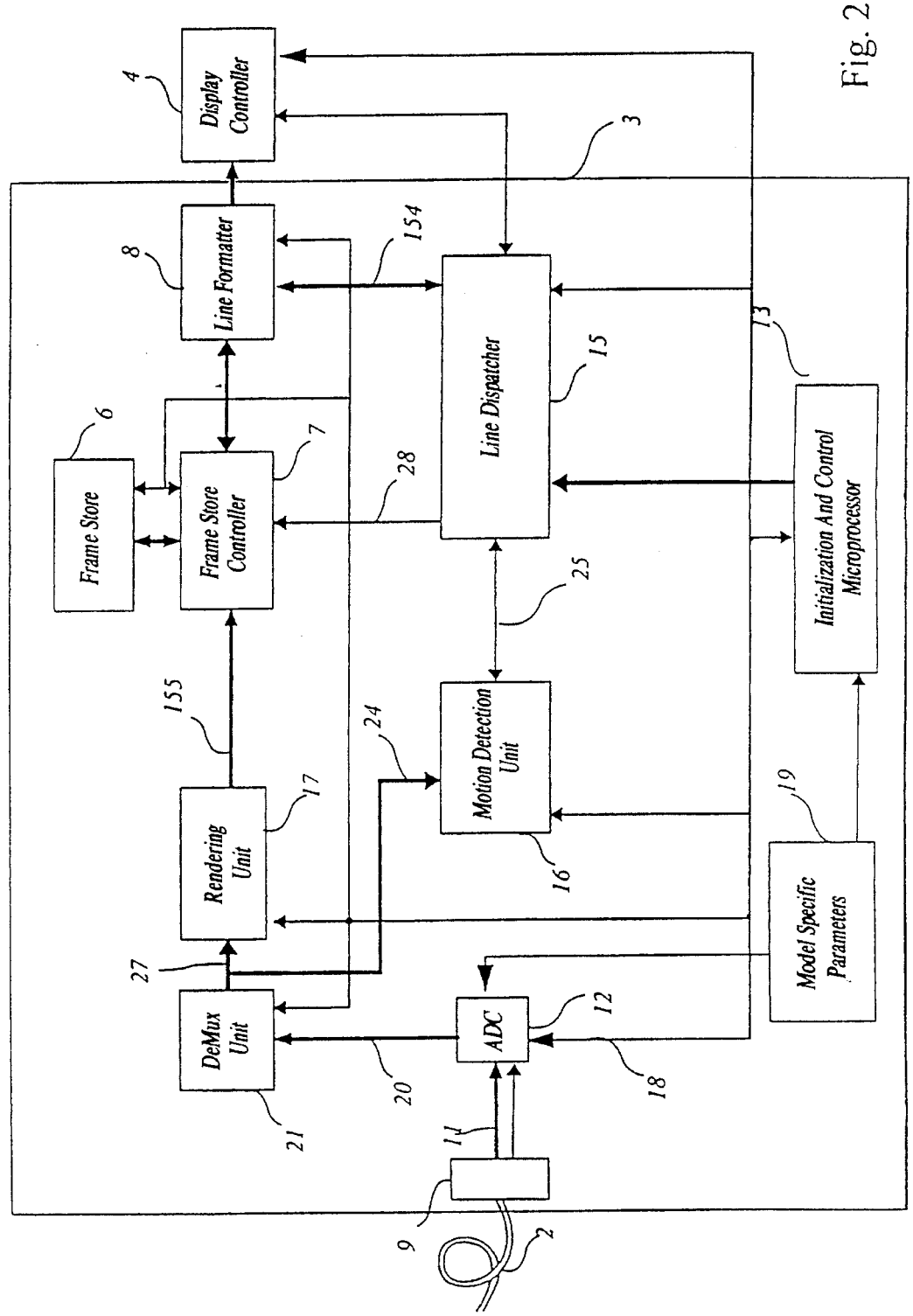
FIG. 2 is a schematic block diagram representation of the display system of FIG. 1.

Referring now to FIG. 2, there is shown the display system 3 in more detail. The analogue input to the display system 3 is achieved by means of the cable 2. The synchronization information of the analogue input is divided or separated from the colour information by an input divider 9. The colour information and synchronization information are then forwarded separately to an analogue to digital conversion unit 12. The Red, Green and Blue analogue input channels 11 from the divider 9 are fed to three analogue to digital converters in the analogue to digital conversion unit 12. Each analogue to digital converter converts its analogue channel input information to a corresponding digital value. The control information is also fed to the analogue to digital conversion unit 12 and is decoded and digitized to produce system control information such as pixel clock (PCLK), line retrace and frame retrace signals. The control information is output with the pixel colour information in addition to being supplied to the remainder of the system 3 via a control channel 18. The control channel 18 couples these signals to various portions of the overall system including an initialization and control microprocessor 13, a demultiplexer 21, a rendering unit 17, line formatter 8, a line dispatcher 14, a frame buffer 6, a frame store controller 7, a motion detection unit 16 and the display controller 4.

The analogue to digital conversion unit 12 requires model specific parameters, crystal timing input information, input control synchronization information as well as the three analogue input channels in order to produce the corresponding binary output pixels for each input pixel at the pixel clock rate which is determined by the model specific parameters. Preferably the model specific parameters are stored in a storage device 19, and are loaded into the analogue to digital conversion unit 12, at start-up time by the initialization and control unit 13.

As an alternative to an analogue input, the cable 2 can convey an input signal in a digital format direct to an input buffer (not illustrated but known in the art), that substitutes for the analogue to digital conversion unit 10.

In order for a single display system 3 to be connected to a multitude of different computer systems, the cable assembly 2 can be preferably fitted with a model specific crystal and/or the storage device 19 (typically a serial EEPROM) from which the initialization and control unit 13 can load model specific parameters into the display system controllers at start-up time. Model specific parameters which tend to vary from system to system include the frequency of the pixel output clock of the computer device 1, the number of pixels per line, the number of lines per frame, horizontal blanking time, vertical blanking time, analogue to digital gain and offset parameters etc. These parameters can then be stored in the cable 2 with different cables being available for different computer devices 1, thereby increasing the versatility and utility of the display system 3.

The number of binary bits and hence the resolution with which digital values are output from the analogue to digital conversion unit 12, can vary according to factors such as the cost and speed of the A/D Converters used. In this embodiment, each A/D converter of a/d converter 12 outputs 8 bits of information for its respective input colour on an A/D output bus 20. Hence, the A/D output bus 20 is at least 24 bits wide, representing a single pixel of display information. Additionally, the a/d converter 12 outputs pixel clocks, frame and other synchronization information on the A/D output bus 20. A demultiplexer 21 groups together two adjacent pixels and outputs them together with clocking and synchronisation information on a bus 27 at half the input rate to the demultiplexer 21. This has the effect of halving the speed with which the rest of the display system 3 is required to work.

The dual pixel output format from the de-multiplexer 21 is fed to the rendering unit 17 which for each 24 bit input pixel information produces a 4-bit output in the form of one bit for each of Red, Green, Blue and White (RGBW) pixel data for the FLCD Display 5. The groups of pixels are output on the rendering unit's output bus 155.

Figure 3:
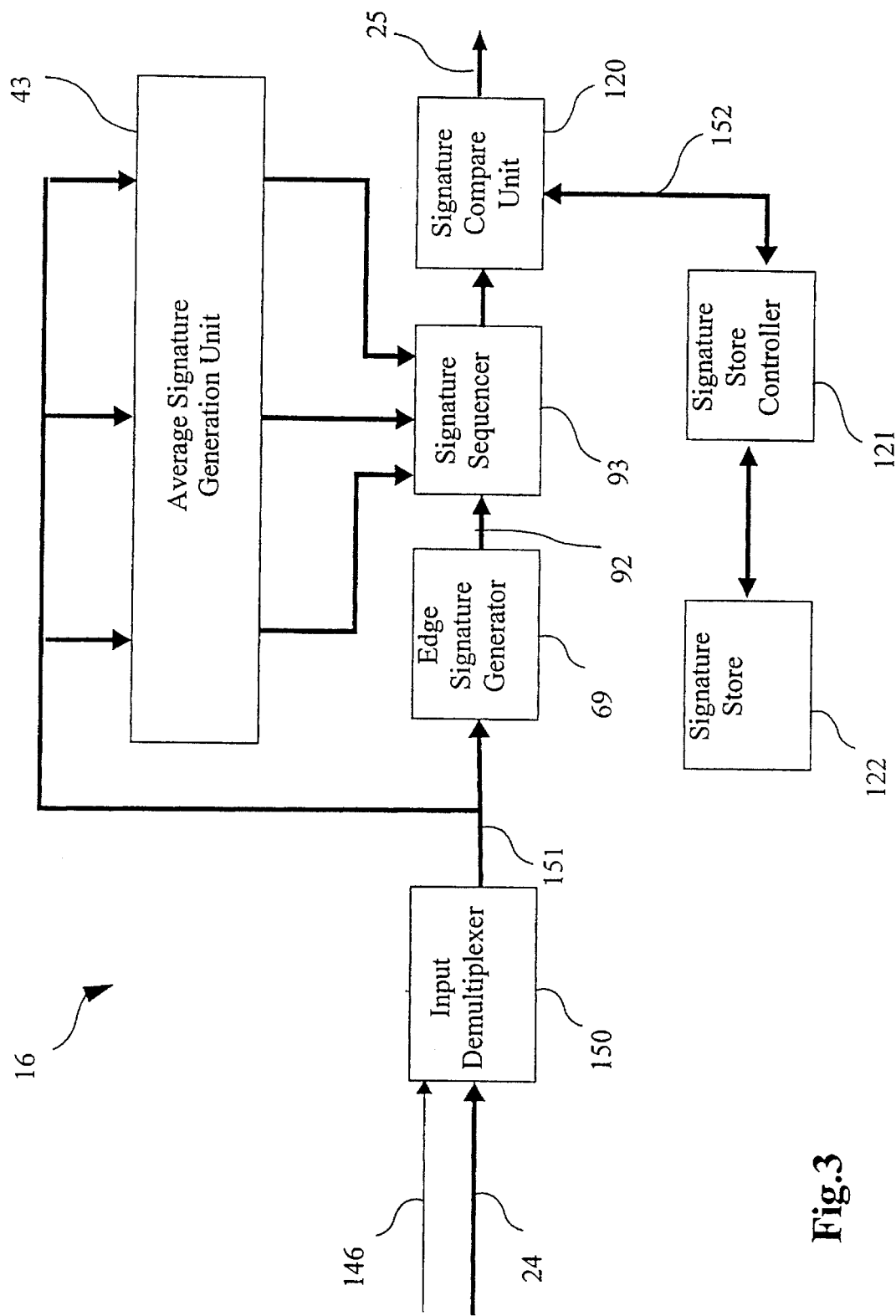
FIG. 3 is a schematic block diagram representation of the motion detector of FIG. 2 in more detail being the preferred embodiment of the present invention.

Turning now to FIG. 3, the motion detection unit 16 is shown in more detail. The motion detection unit 16 receives input from motion detector input bus 24. This bus includes one channel capable of carrying two pixels at a time, and an associated control information channel 148. In order to ease the processing speed requirements, the pixel information 24 is further demultiplexed by input demultiplexer 150, whereby two groups of two pixels are grouped together so that the rest of the motion detection unit 16 operates on groups of four pixels. By reducing the speed requirements at which the motion detection unit 16 must operate, an implementation in a more economical technology is possible. Hence groups of four pixels, each of 24 bits, are output on a bus 151.

The red, green and blue individual primary colour portions of each pixel in addition to relevant control information is fed to an average signature generation unit 43, The average signature generation unit 43 implements, on each primary colour portion of the image, a first motion detection method conveniently called an 'average signature method' of determining a priority for the updating of a given line of the screen. This method determines a specific summation of an 'average region' of pixel values of a line as will be described hereinafter, and outputs an average signature value to a signature sequencer 93 for each region of a line.

The input pixels are also fed to an edge signature generator 69 which uses them to determine a set of edge values in accordance with an 'edge detection method', to be described hereinafter. One set of edge values is output to the signature sequencer 93 for each predetermined 'edge region'. An edge region being different from an area region.

The area values and edge values are both output to the signature sequencer 93, which packs these values into a 48-bit sample and outputs the sample to a signature compare unit 120.

The signature compare unit 120 takes the samples from the average signature sequencer 93 and samples from a previous frame, which have been stored in a signature store 122 and are input via a signature store controller 121, and determines two priority values for each line of the current input frame, outputting the values on motion detector output bus 25.

Figure 4:
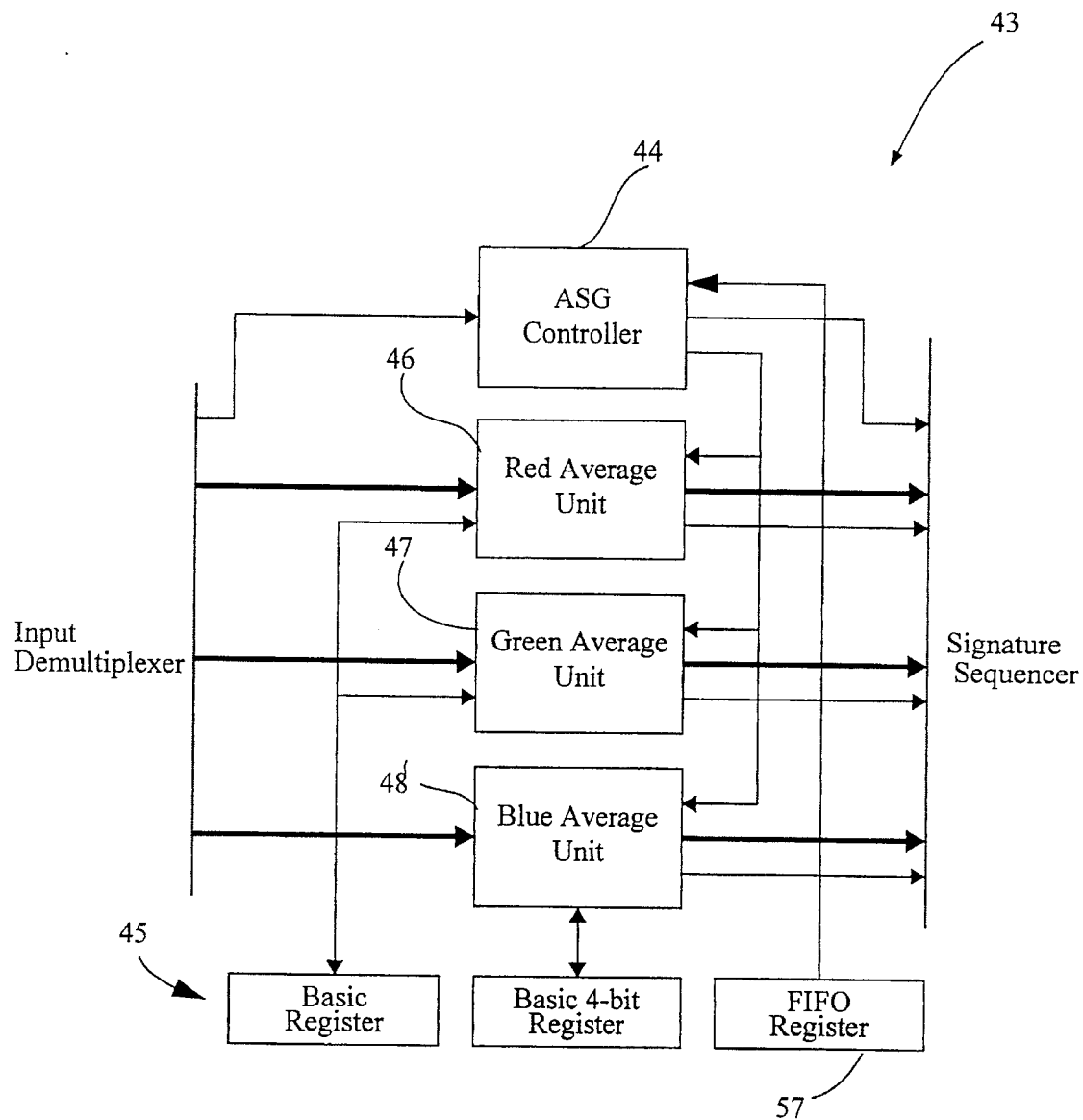
FIG. 4 is a schematic representation of the Average Signature Generation unit of FIG. 3.

Referring to FIG. 4 there is shown the average signature generation unit 43 in more detail. The average signature generation unit 43 consists of three registers 45, an average signature generation controller 44, red average signature unit 46, green average signature unit 47 and a blue average signature unit 48 with each colour signature unit being identical.

The average signature generation unit 43 produces signatures based on the average pixel values of each colour over a horizontal scanline segment. A weighted pixel stream is formed from the input pixel stream of a single colour by multiplying each pixel by 1, −1 or 2 depending on a pseudo-random input control pattern. This weighted pixel stream is summed. The result of the summation over a line-segment of programmable length is the average signature.

Figure 7:
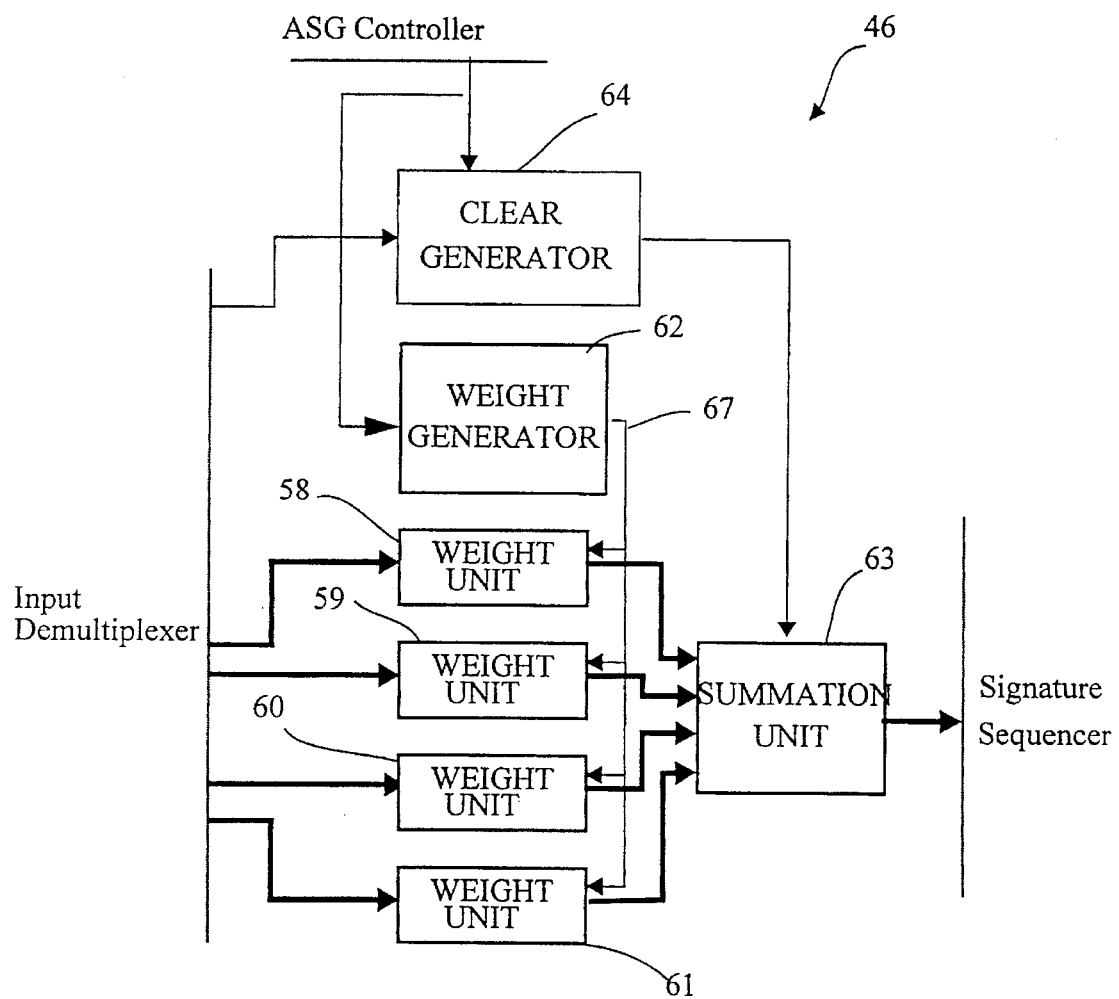
FIG. 7 is a schematic block diagram representation of the red average signature unit of FIG. 4.
Figure 8:
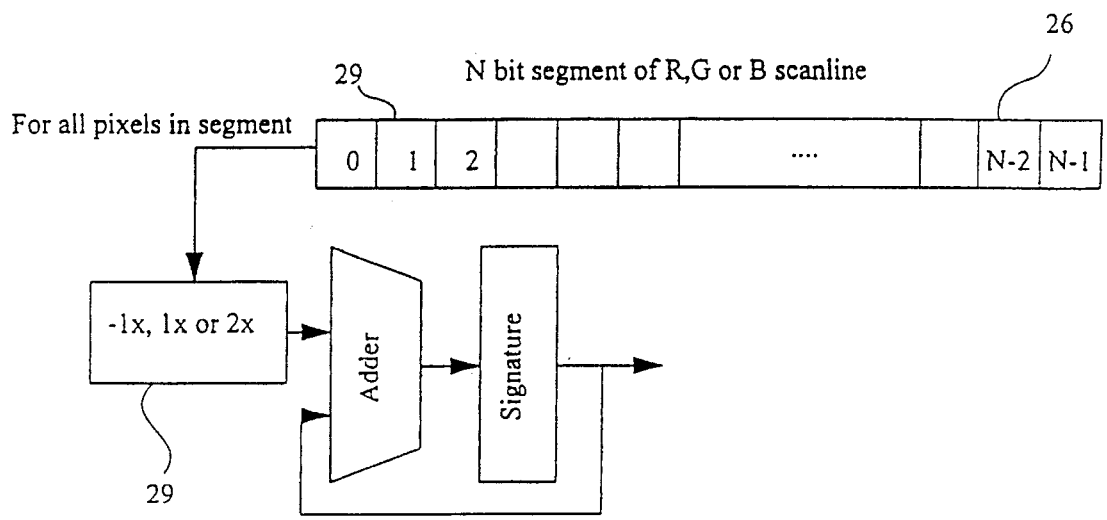
FIG. 8 is a schematic block diagram representation of the process of obtaining an average of a n-bit line segment.

Referring now to FIG. 7, there is shown the red average signature unit 46 in more detail, with the green average signature unit 47 and the blue average signature unit 48 being identical. The red average signature unit 46 implements an average signal generation algorithm which will now be described with reference to FIG. 8. The input image is divided into lines and each line is divided into a predetermined number of line segments 26 having N pixels 29. The incoming N pixels of a line segment are forwarded to a multiplier 31 and are preferably multiplied by the value '−1', '1' or '2'. The actual value of multiplication is determined pseudo-randomly. The same pseudo-random number generator seed is used at the start of each frame, so the value for multiplication chosen for the same pixel of subsequent frames is also the same. Preferably, a seed is chosen which minimizes the coincidence of multiplication patterns for pixels in the same column for a current line and the lines above and below the current line. This has been found to reduce the possibility of the motion detection method failing to detect a change in a vertical feature of subsequent images.

Figure 5:
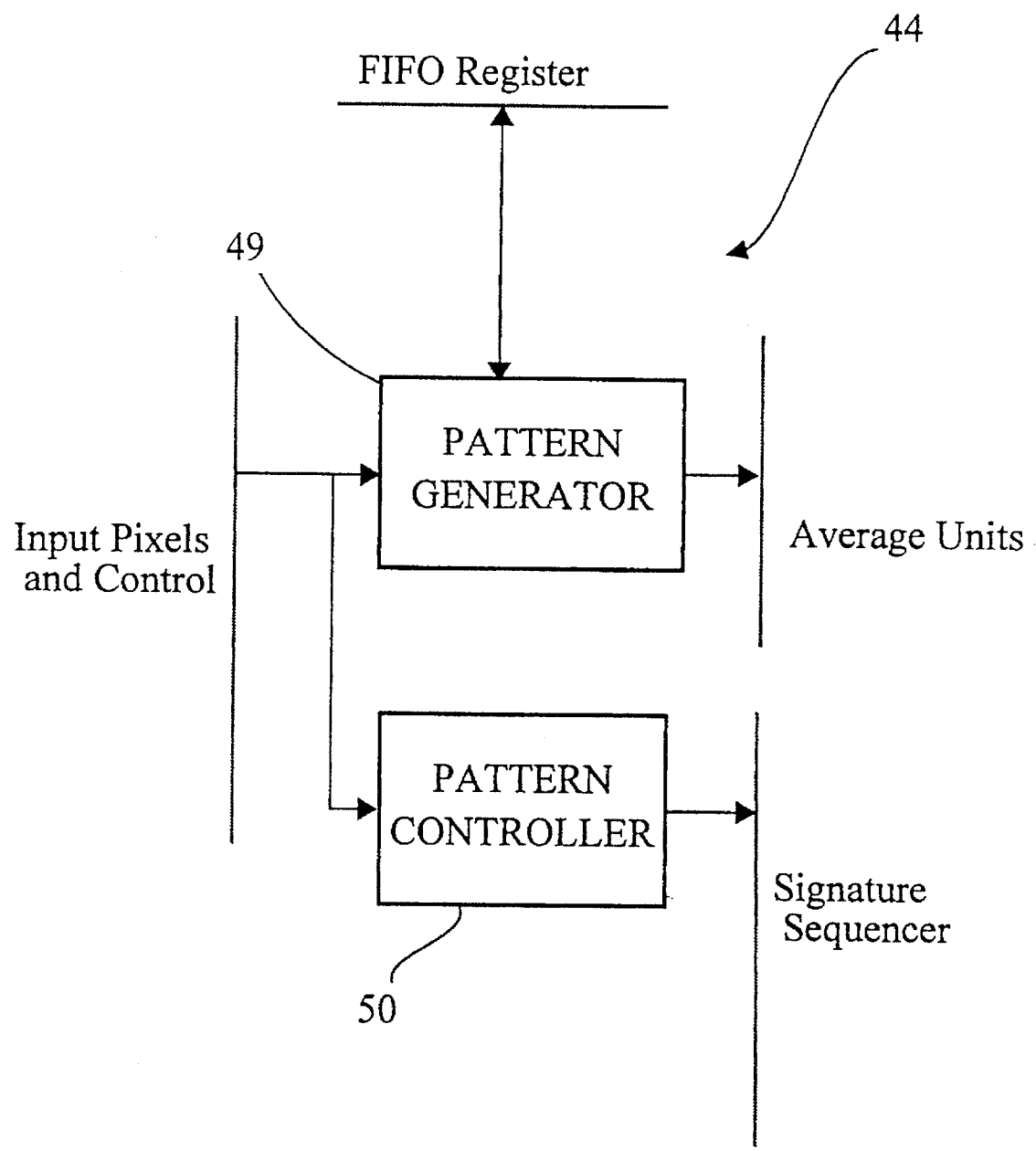
FIG. 5 is a schematic block diagram representation of the average signature generation controller of FIG. 4.

Referring now to FIG. 5, there is shown the average signature generation controller 44 in more detail. The average signature generation controller 44 consists of a pattern generator 49 and a pattern controller 50. The pattern generator 49 generates the control patterns for each of the average signature units, and holds a segment length value for each unit. The pattern controller 50 also generates output signals when output data to the signature sequencer is valid. Only one set of output signals is necessary since all the average signature units will have the same minimum and maximum stages of pipeline delays before generating their first valid signature and generating their final signature during a scan line.

Figure 6:
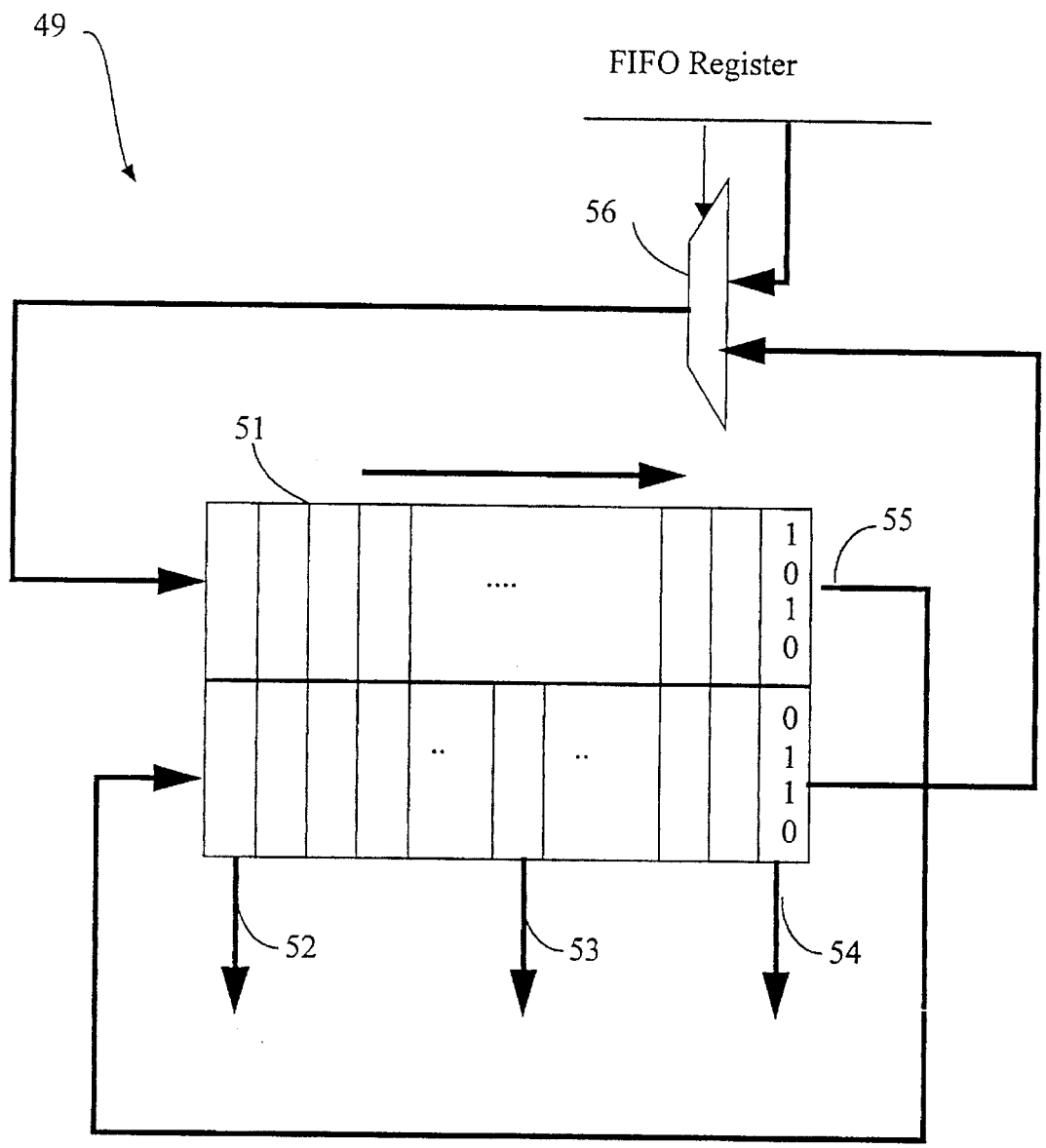
FIG. 6 is a schematic block diagram representation of the pattern generator of FIG. 5.

Referring now to FIG. 6, there is shown the pattern generator 49 in more detail. The pattern generator 49 includes a 34 bit long and eight bit wide first-in-first-out register (fifo) 49 which cycles weight patterns. The weight patterns are read out of the fifo 51, four bits at a time, at various points including blue pattern readout 52, green pattern readout 53 and red pattern readout 54 and forwarded to the average signature generation units 46–48.

At the end of the fifo, the top four bits are fed 55 into the start of the fifo to form the bottom four bits. The bottom four bits are fed into the start of the fifo, via multiplexer 56 to form the top four bits. At the end of each frame, the initial data is loaded into the fifo 51 from fifo register 57 (FIG. 4) via multiplexer 56 so that the same pattern is generated from frame to frame.

Referring now to FIG. 7, the red average signature unit 46 includes a series of weight units 58–61, one for each input pixel, the input pixels being demultiplexed to enter four at a time. The weight units 58–61 multiply their input values by '–1', '1' or '2' as determined by the control outputs of a weight generator 62.

The weight generator 62 reads in a 4-bit pattern word from the average signature generation controller 44 and generates control signals 67 for the weight units 58–61. One bit is input from the average signature generation controller 44 for each pixel. The control signals 67 are two bits wide. These are formed by taking one bit as the input bit and forming the second bit according to the following formula If pattern input=0 then second bit =0

If pattern input=1 then toggle second input.

Figure 9:
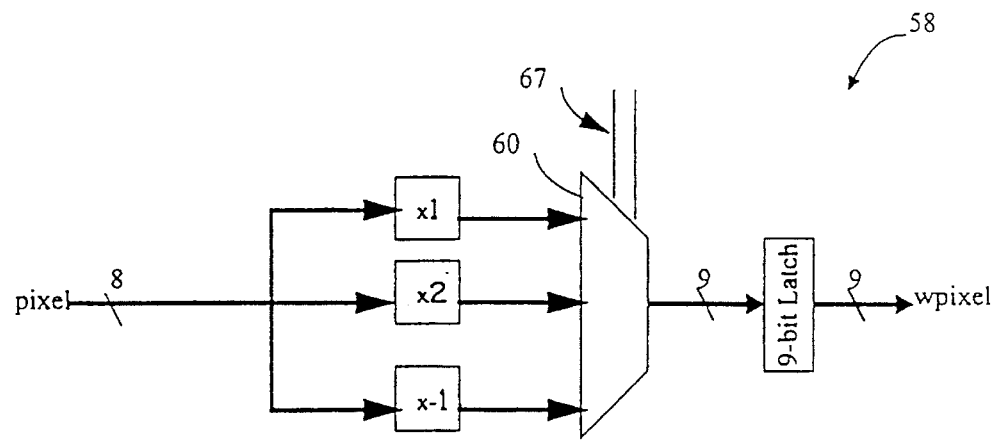
FIG. 9 is a schematic block diagram representation of the weight unit of FIG. 7.

Referring now to FIG. 9, there is shown a weight unit 58 in more detail. The weight unit forms the values '–1', '1' or '2' times the input value and selects one of these via a multiplexer 66 depending on the state, of control signals 67 from weight generator 62. As the output may be of larger magnitude than the input, extra data lines are required. The output of the multiplexer 66 is latched 68 before being output.

Referring again to FIG. 7, a summation unit 63 takes the outputs from the weight units and adds them together for outputting to a signature sequencer 93 after a programmed number of pixels have been processed. After outputting to the signature sequencer 93, the summation unit 63 is reset to zero.

A clear generator 64 generates a clear signal for the summation unit 63 after the number of pixels processed is equal to the length of the current segment.

Returning now to FIG. 3, the groups of four pixels, each of 24 bits, which are output on bus 151 are also fed to an edge signature generator 69. The edge signature generator 69 processes the input pixels to detect the occurrence of edges.

Figure 10:
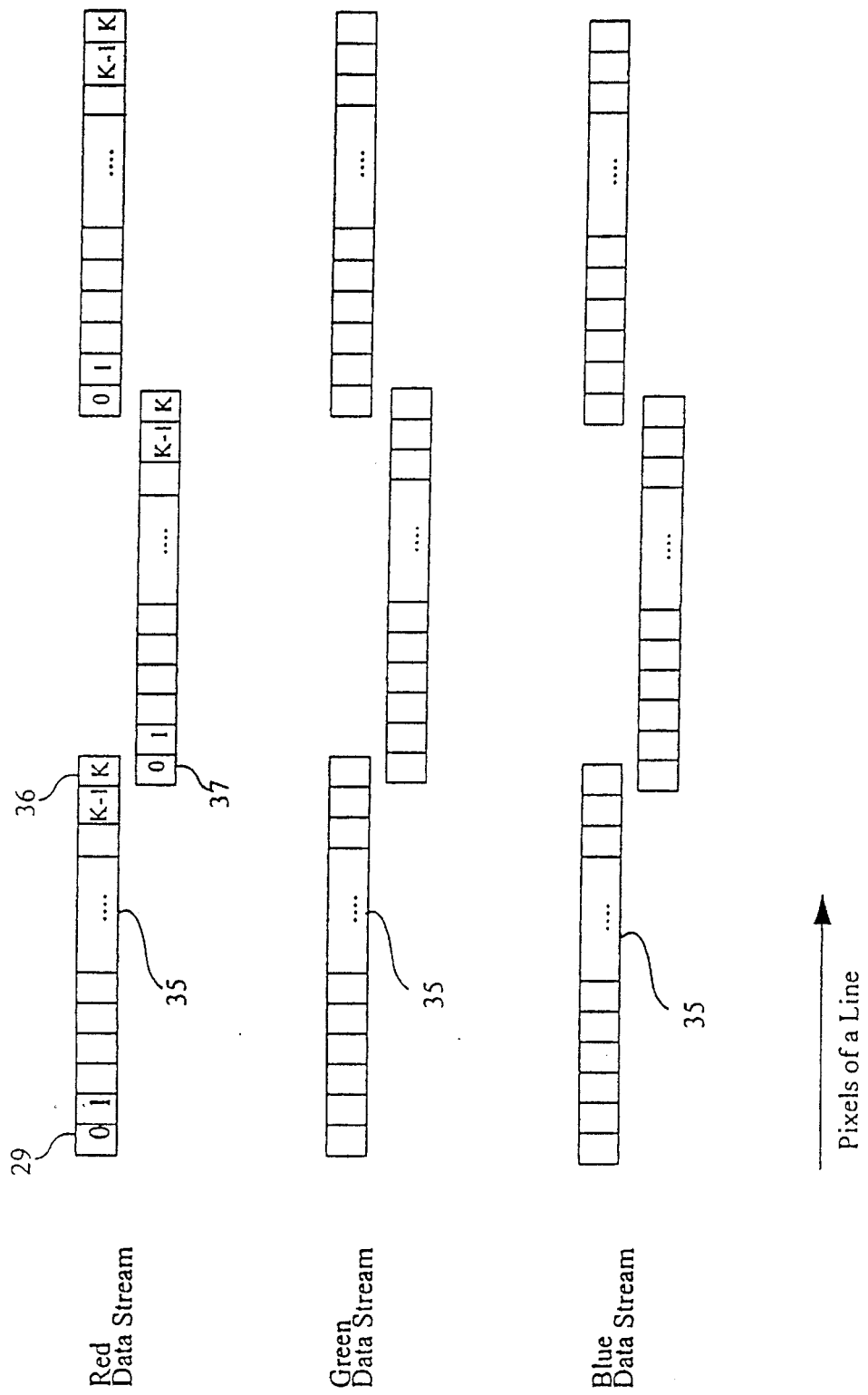
FIG. 10 illustrates the line break up for edge detection.
Figure 11:
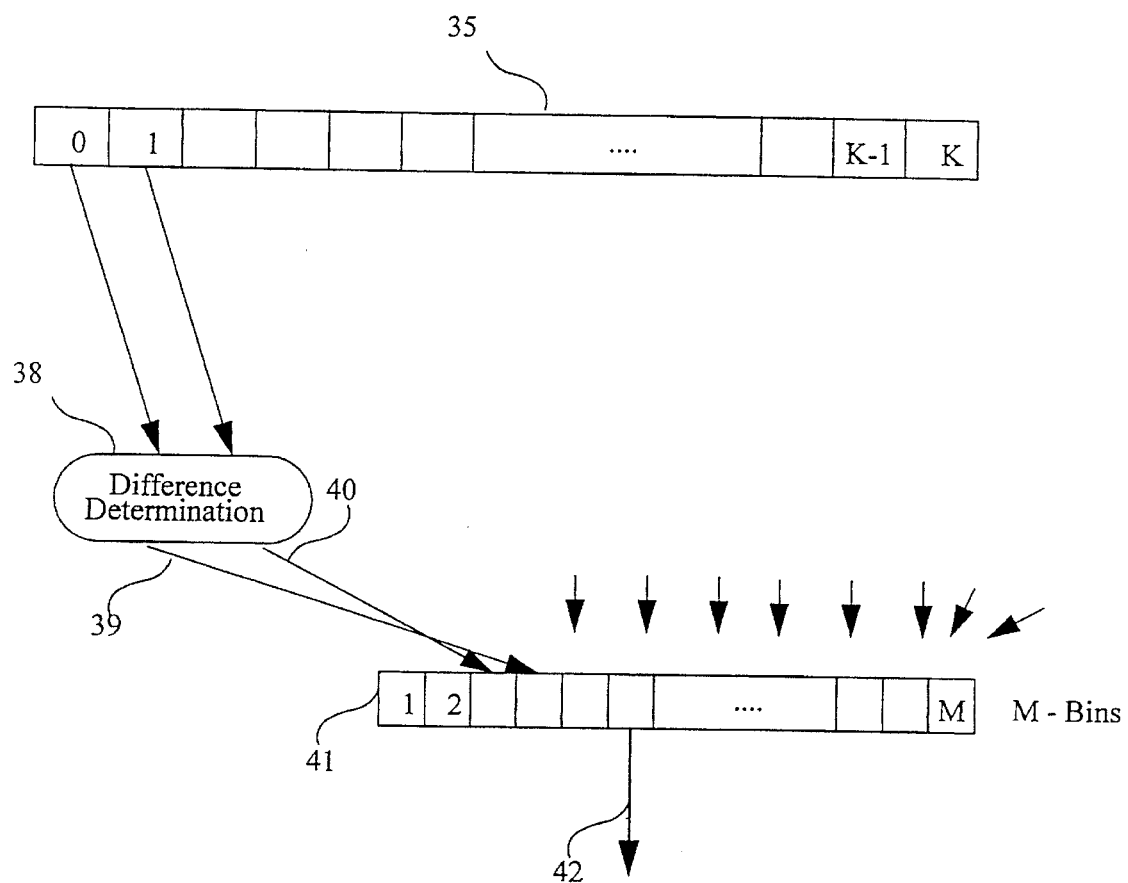
FIG. 11 illustrates the edge collection for a line segment.

FIG. 10 and FIG. 11 illustrate the method used which is called 'an edge detection method' and which is suitable for determining whether edges in an input image have moved, and for determining a priority value. The edge detection method will now be explained. The red, green and blue pixel input streams are each divided into line segments 35 of length K+1. The last pixel 36 of a particular line segment is included in the segment as well as being included as the first pixel 37 of the next line segment.

As seen in FIG. 11, for each individual line segment 35 of the input data stream, the value of the difference between adjacent pixels is determined 38. This difference value is used to produce two further values, conveniently called a negative slope value 39 and positive slope value 40. If the difference value is positive, then the positive slope value 40 is set to be equal to the difference value and the negative slope value 39 is set to equal zero. If the difference value is negative, then the positive slope value 40 is set to be equal to zero and the negative slope value 39 is set to equal the absolute value of the difference value.

This difference value between two adjacent pixels can be conveniently called an 'edge'. As there are K+1 pixels in a line segment 35, there will be K edges per line segment and 3*K edges for the red, green and blue portions of a line segment. Each edge produces two slope values. Hence, there will be 2*3*K values produced for each segment.

These slope values are assigned to one of M groups or 'bins' 41. The determination of which bin to assign the two slope values from each primary colour stream is determined by a second pseudo-random number sequence which can take the form of a ROM lookup table. This second sequence is also restarted at the start of each frame so that the bins 59 chosen for a given pixel do not change with changing frames. The mapping of slope values to bins is primary colour stream independent, such that a bin can contain red, green or blue slope values. Preferably the mapping to bins is such that the red, green and blue edge values go to different bins and the positive and negative slope values also go to different bins. Preferably, the number of bins is greater than the number of slope values produced by a single pixel (in this case, greater than six).

In a modification of the above process, only a subset of the edges might be assigned to the bins with the pattern of assignment being such that edges not assigned in a current line are assigned in the next line or the line after the next line.

Within each bin, the absolute values of the incoming edges are compared with a current maximum value stored in the bin, and the maximum of the two becomes the new current maximum value. At the end of a segment the maximum value stored in each bin can be read out via a bin signature output 42. A pseudo-code outline of the method used in determining this output value is presented in Appendix B. All of the signatures for one line are cumulatively compared. That is as each signature is generated it is compared with the previous and the maximum retained. A pseudo-code for the signature comparison method is shown in Appendix C.

Figure 12:
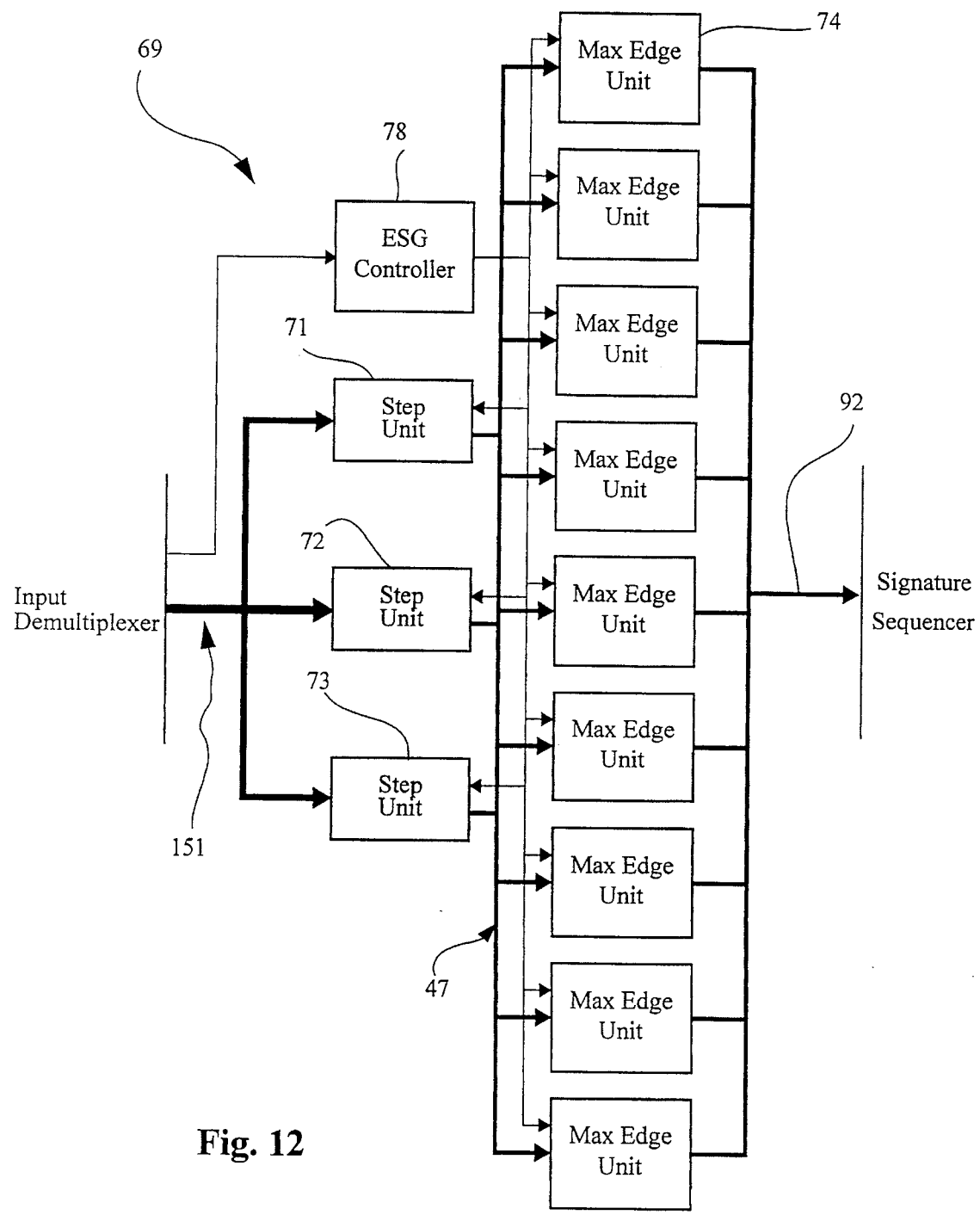
FIG. 12 is a schematic block diagram representation of the edge signature generator of FIG. 3.

Referring now to FIG. 12, there is shown, in more detail, the edge signature generator 69 which implements the edge detection method. Pixels are input at a rate of four pixels at a time from demultiplexer bus 151 to step units 71–73, with one step unit handling each colour. Control information, such as pixel clocking and vertical and horizontal time signals, is input to an edge signature generator (ESG) controller 78.

Figure 13:
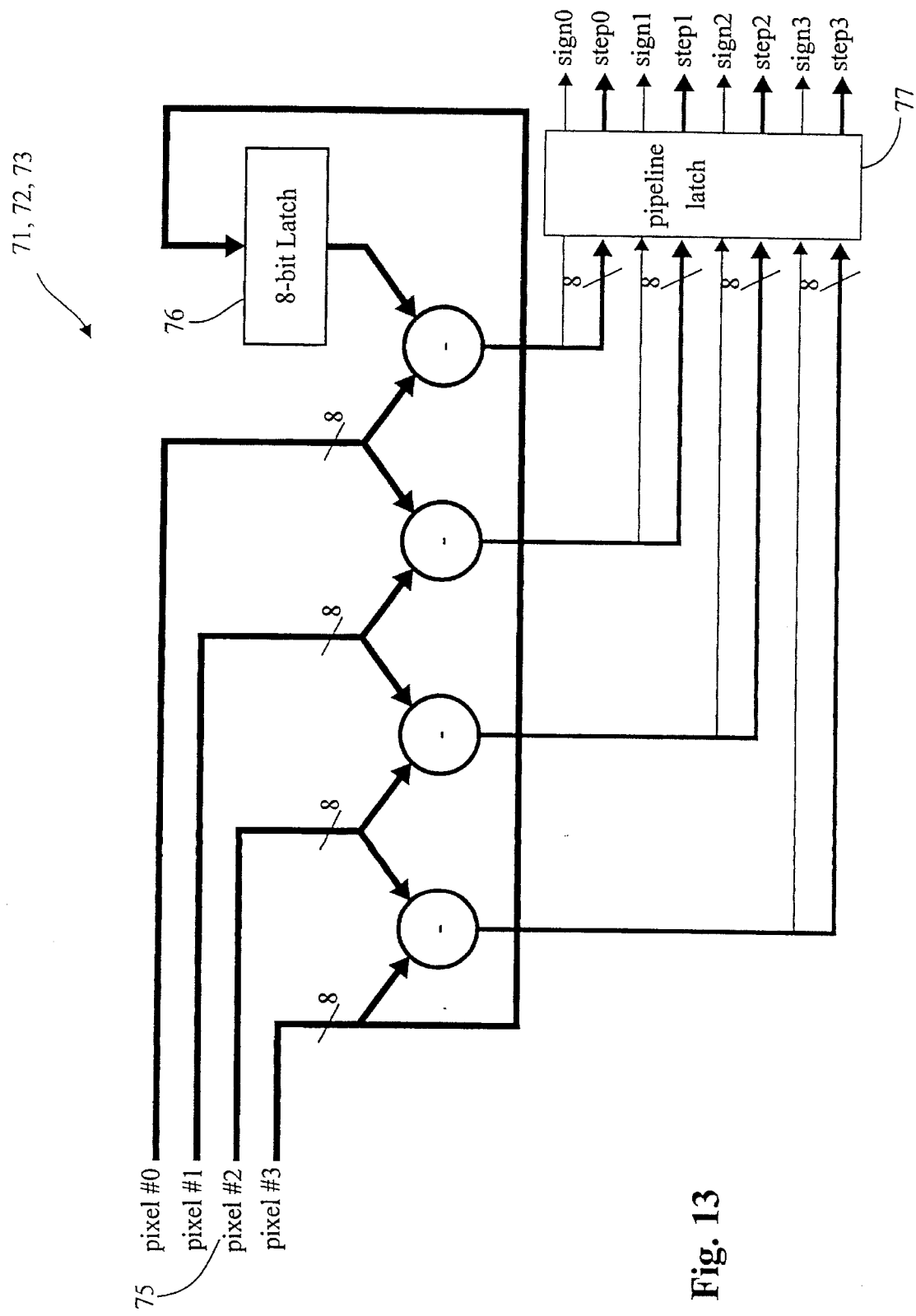
FIG. 13 is a schematic block diagram of one of the step units of FIG. 12.

Referring now to FIG. 13, there is shown, in more detail, one of the step units 71–73. The step units generate a sign bit and an absolute difference between each pixel pair for each colour. The input data 75 is four lots of 24-bit per pixel RGB data, along with pixel clock and vertical and horizontal synchronisation signals (not shown). As the input is in the form of four pixels at once, the edge method is implemented by saving the last pixel value from the previous group of pixels on a line in latch 76, in order to obtain a difference value with the first pixel of the current group of pixels and the last pixel in the last group of pixels. The absolute difference values and sign bits are latched 77 before they are then forwarded to a collection of maximum edge units 74 (FIG. 12).

Referring again to FIG. 12, the choice of which maximum edge unit 74 to forward the absolute difference value to is determined by an input 78 from the ESG controller 70 which chooses a maximum edge unit 74 in a pseudo-random order as mentioned previously. Each maximum edge unit 74 receives its edge value and compares it with a previously stored current maximum edge value.

Figure 14:
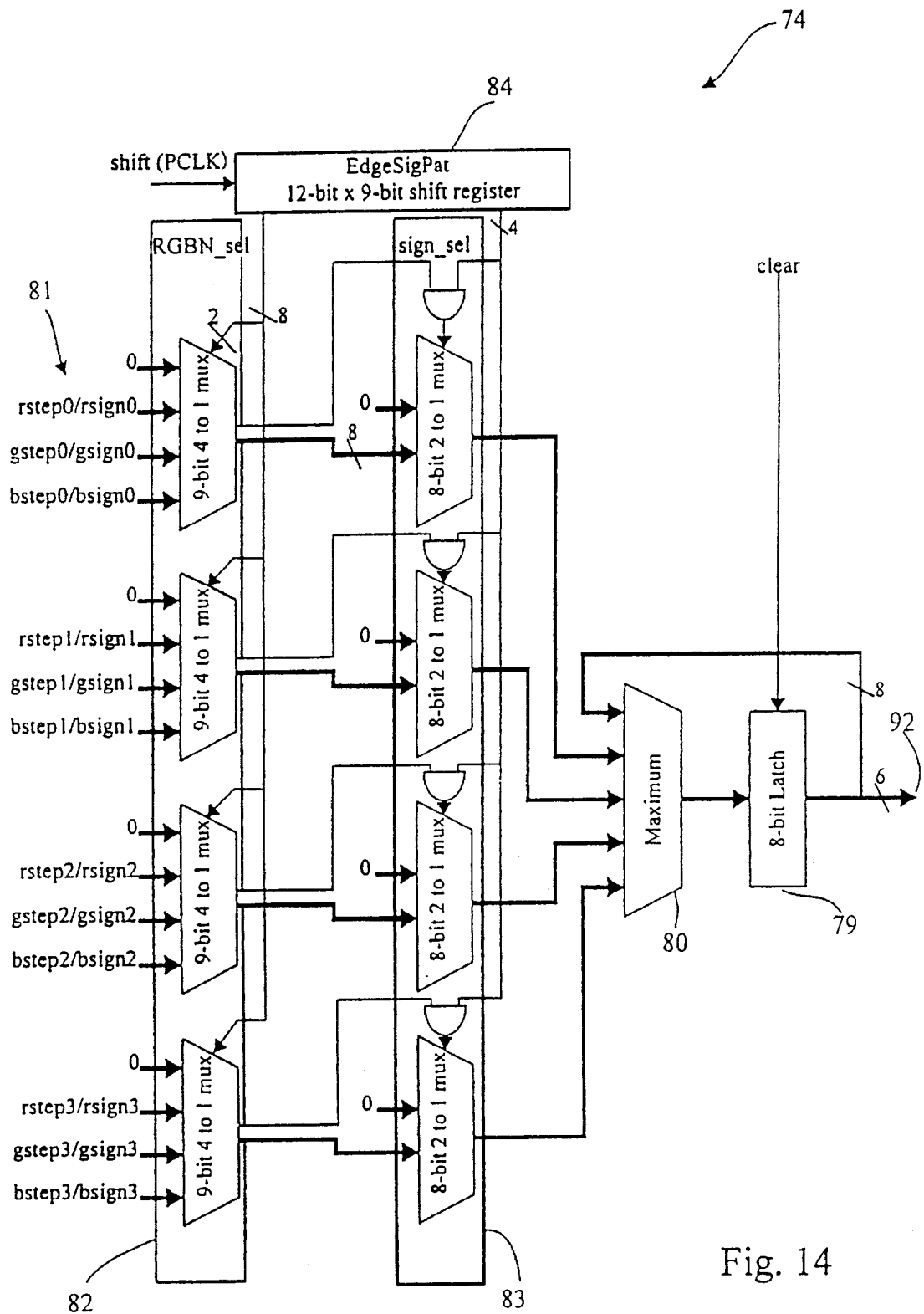
FIG. 14 is a schematic block diagram representation of one of the maximum edge units of FIG. 12.

Referring now to FIG. 14, there is shown the maximum edge unit 74 in more detail. The maximum edge unit 74 uses a maximum determination unit 80 to generate the maximum value of a set of four step values, and a previously saved maximum, which is saved in latch 79. After a predetermined number of pixel clock cycles (PCLK), the maximum value is dispatched to the bin output bus 92 and the latch 79 is reset to zero.

The input samples 81 are selected using three control bits per step and using two stages of multiplexers, including first stage 82 and second stage 83. The first stage 82 of multiplexers use two bits to select the magnitude of the red step, green step, blue step or no step input values. The second stage 83 of multiplexers use a third control bit 'ANDed' with the sign of the selected step to select either the first stage magnitude or zero.

Each maximum edge unit 74 requires twelve selection bits per pixel, eight for the first stage 82 and four for the second stage 83. That is for each of the demultiplexed pixel streams it is necessary to have two bits to select the R, G, B or no edge and one bit to select whether it is positive or negative. The existence of nine maximum edge units necessitates the generation of the control data to be as local as possible. Hence each maximum edge unit 74 contains a edge pattern register 84 of 12 bits, whose values are shift rotated on each fourth pixel clock.

Figure 15:
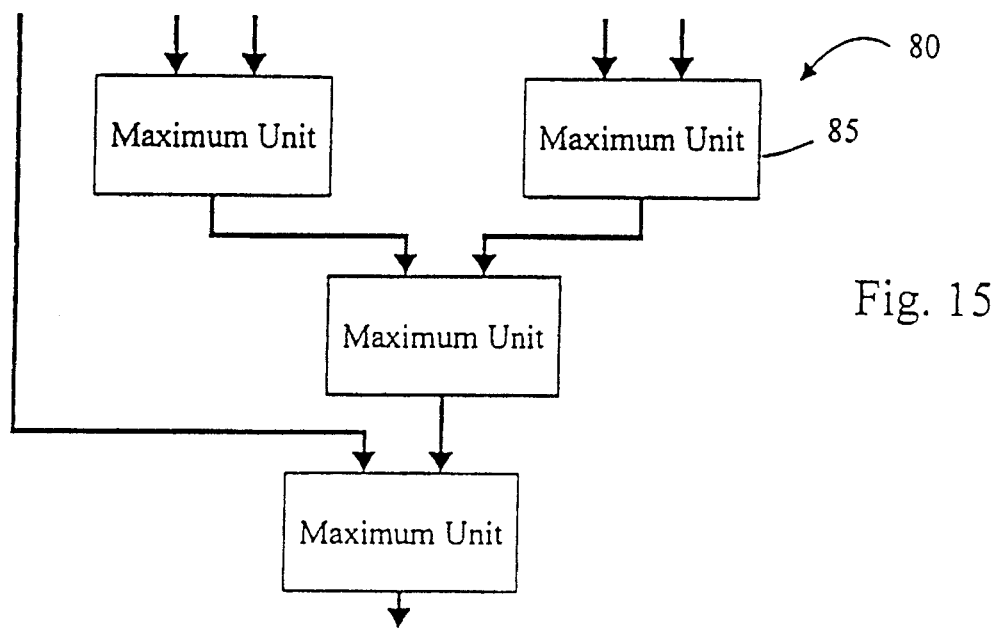
FIG. 15 is a schematic block diagram representation of the maximum determination unit of FIG. 14.
Figure 16:
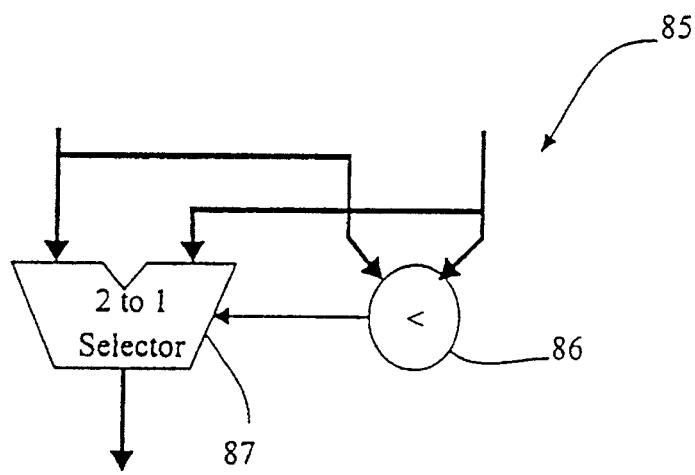
FIG. 16 is a schematic block diagram representation of a two input maximum unit of FIG. 15.

Referring now to FIG. 15, there is shown the maximum determination unit 80 in more detail. The maximum determination unit 80 determines the maximum of five inputs by determining the maximum of two inputs 85, multiple times. Referring now to FIG. 16, there is shown a two input maximum unit 85 in more detail and consists of a comparator 86 and a multiplexor 87, with the comparator 86 output being used to control the multiplexor 87 so as to produce the maximum of its two inputs.

Figure 17:
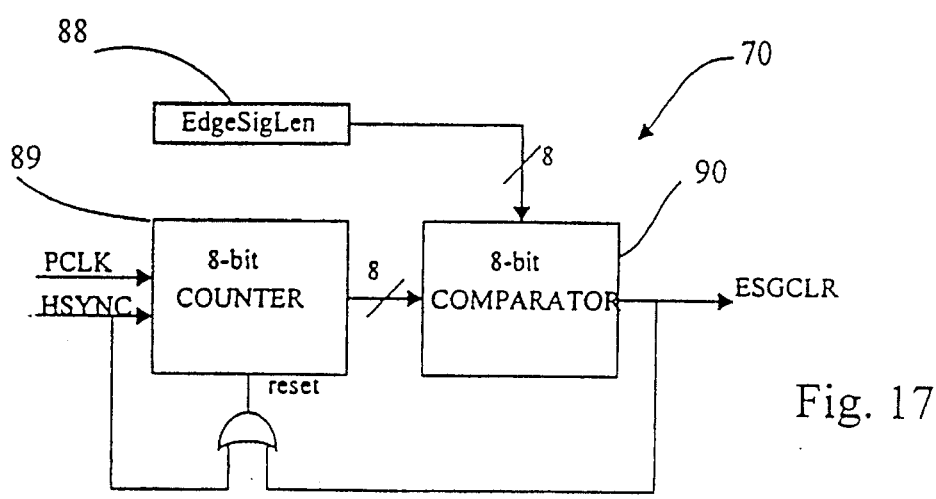
FIG. 17 is a schematic block diagram of the ESG controller of FIG. 12.

Referring now to FIG. 17, there is shown the ESG controller 70 of FIG. 12 in more detail. The ESG controller 70 generates the signals that regulate the data flow of the edge signature generator 69. The required control signals are clear signals to the output latches of the step units 71–73 and the maximum edge unit 74, and the selection signals to the multiplexers in the maximum edge unit 74. An edge segment length register 88 stores the predetermined length of each segment. An eight bit counter 89 counts up on each pixel clock (PCLK) and is compared 90 with the value in the edge segment length register 88. Once the values are equal, an ESG clear signal 91 is sent out in addition to the eight bit counter 89 being reset. The eight bit counter 89 is also reset on the occurrence of each new line (HSYNC).

Referring again to FIG. 12, as mentioned previously, after a predetermined number of cycles, the maximum value of each maximum edge unit 74 is made available to be output to the signature sequencer 93 via bin output bus 92, and the current maximum edge values for all the maximum edge units 74 are reset to zero.

Referring again to FIG. 3, the output values from the average signature generation unit 43 and the edge signature generator 69 are fed to a signature sequencer 93.

Figure 18:
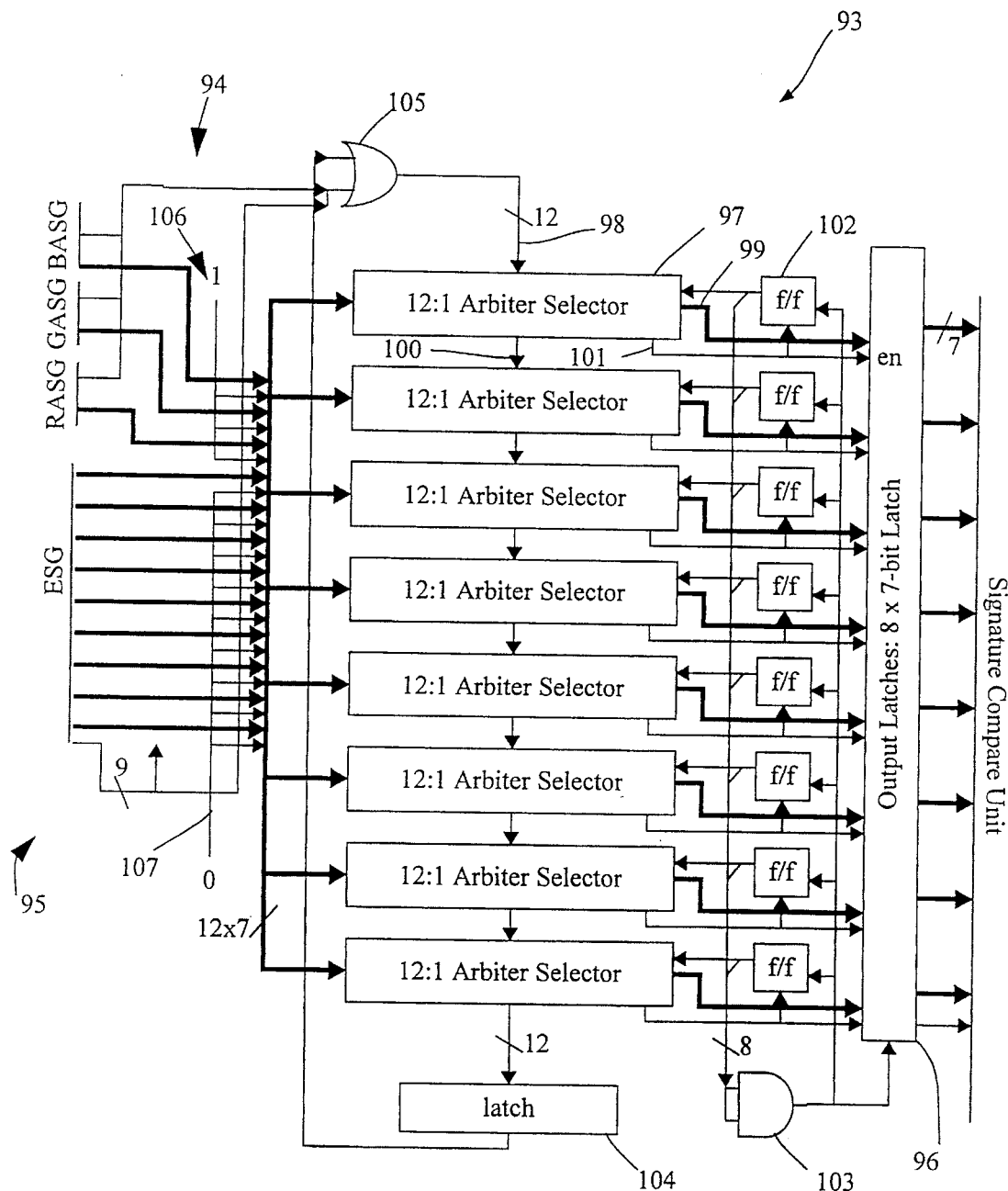
FIG. 18 is a schematic block diagram of the signature sequencer of FIG. 3.

Referring now to FIG. 18, there is shown, in more detail, the signature sequencer 93. The signature sequencer 93 takes three 6-bit average signature inputs 94 at the output rate of the average signature generation unit 43 and M (with M being, in this case 9) 6-bit edge signature inputs 95, at the output rate of the average signature generation unit 43, and selects eight of these signatures for packing into one 56-bit latch 96 thereby forming a sample which is output to the signature compare unit 120. The signature packing performed by the signature sequencer 93 has an ordering that is repeated frame to frame. For each signature which arrives a signature arrival identifier is forwarded to OR gate 105 in conjunction with the output from latch 104.

In addition to the signatures, a signature signification bit being either a 1 bit 106 or a 0 bit 107 is input with the signature to distinguish average signatures from edge signatures.

The twelve input signatures arrive independently, but each signature arrives at a constant rate. The signature sequencer 93 must pack the signatures from each frame into the same sequence. This way one 48-bit signature word sent to the signature compare unit 120 can be correctly compared to the corresponding word from a previous frame. Along with the 48 signature bits, 8 control bits are passed to signature compare unit 120 indicating the arrival of each of the 8 signatures.

The arbiter selector output 99 is fed to the 56-bit latch 96. The 56-bit latch 96, is formed from 8 separate 7-bit output latches which are loaded with the valid signatures latched at the inputs and an extra bit indicating the type of signature.

The 12 to 1 arbiter selector 97 is a 12 to 1, 7-bit selector which selects an input depending upon the values of its input control signals 98. The selection signals are output 100, with the select control corresponding to the input which was selected being cleared. An inhibit signal is provided amongst the input control signals 98, which allows for the passing of all select signals through unchanged, and a valid signal is asserted if an input is selected.

Referring now to FIG. 19 to FIG. 22 there will now be discussed the operation of the 12 to 1 arbiter selector 97.

Figure 19:
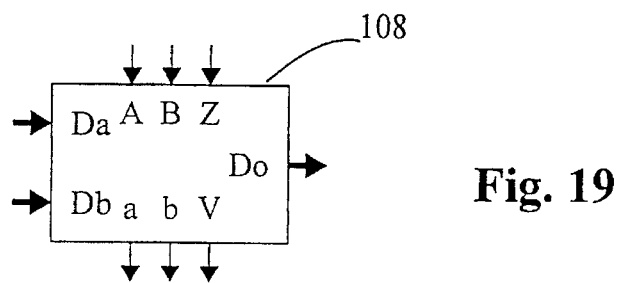
FIG. 19 is a schematic block diagram of a 2 to 1 arbiter selector.

Referring now to FIG. 19, there is shown a 2 to 1 arbiter selector 108 which takes two inputs being Da and Db and selects one of those inputs, outputting Do, under the control of selection inputs A and B. The selection outputs a,b correspond to the selection inputs with the bit corresponding to the input which was selected having been cleared.

An inhibit signal Z is used to inhibit the operation of the 2 to 1 arbiter selector 108 and the valid signal V is asserted if one of the inputs has been selected.

The truth table of the 2 to 1 arbiter selector 108 is shown in Table 1,:

TABLE 1

2 to 1 Arbiter Truth Table

| A | B | Z | Do | a | b | V |
|---|---|---|----|---|---|---|
| 0 | 0 | 0 | X  | 0 | 0 | 0 |
| 0 | 1 | 0 | Db | 0 | 0 | 1 |
| 1 | 0 | 0 | Da | 0 | 0 | 1 |
| 1 | 1 | 0 | Da | 0 | 1 | 1 |
| 0 | 0 | 1 | X  | 0 | 0 | 0 |
| 0 | 1 | 1 | X  | 0 | 1 | 0 |
| 1 | 0 | 1 | X  | 1 | 0 | 0 |
| 1 | 1 | 1 | X  | 1 | 1 | 0 |

The logic formula for the 2 to 1 arbiter selector 108 can be expressed by the following equations:

$$V=\bar{Z}(A+B)$$

$$a=Z\times A$$

$$b=B\times (A+Z)$$

$$Do=A\times Da+\bar{A}B\times Db$$

Figure 20:
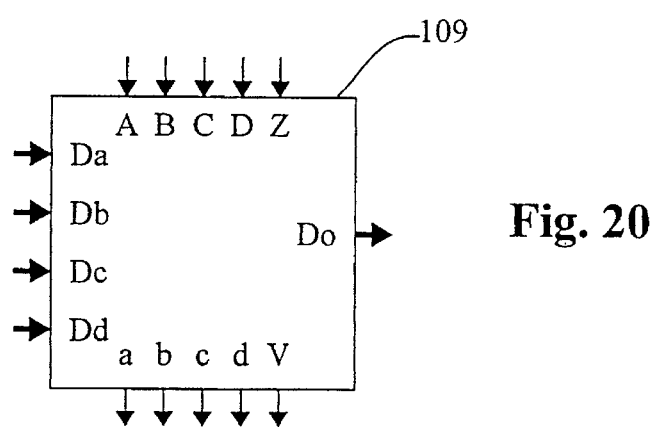
FIG. 20 is a schematic block diagram of the symbolic form of a 4 to 1 arbiter selector.

Referring now to FIG. 20 there is shown a 4 to 1 arbiter selector 109 having four inputs Da to Dd, four input selectors A–D, valid signal V, inhibit signal Z and one output Do. The 4 to 1 arbiter selector 109 operates in the same manner as the 2 to 1 arbiter selector 108 but selects amongst four inputs.

Figure 21:
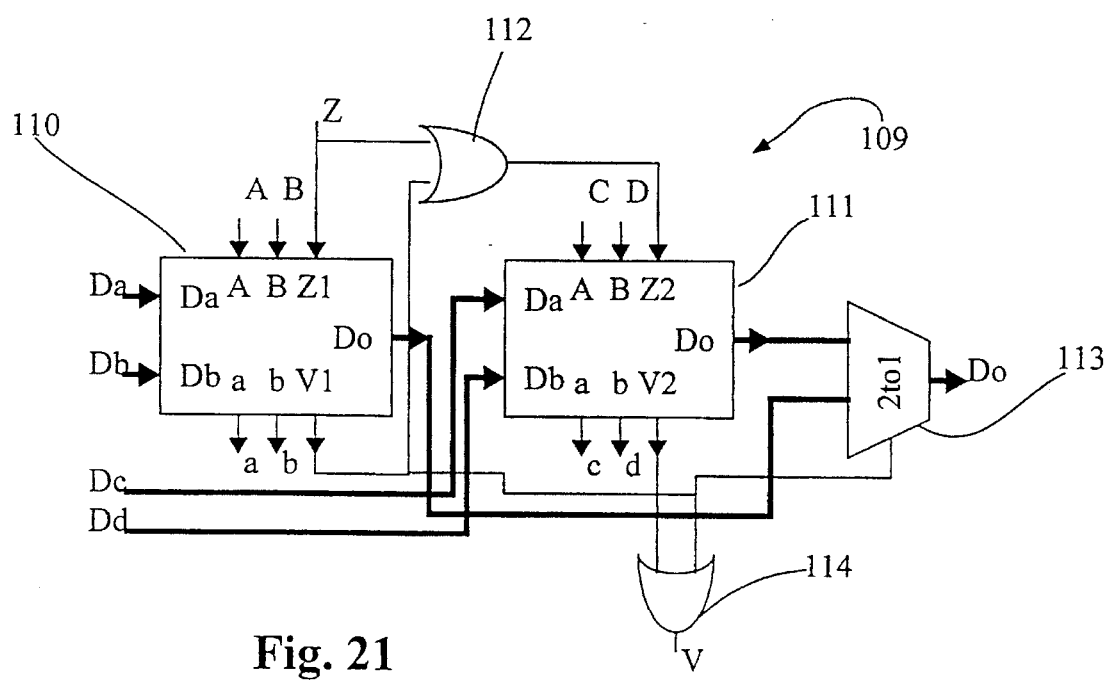
FIG. 21 is a schematic block diagram of the construction for a 4 to 1 arbiter selector.

Referring now to FIG. 21 there is shown the construction of the 4 to 1 arbiter selector 109 from two 2 to 1 arbiter selectors 110, 111. The first 2 to 1 arbiter selector 110 selects amongst the first two inputs Da and Db under the control of selection inputs A and B. If the selection occurs then the valid signal V1 goes high, thereby deactivating the second 2 to 1 arbiter selector 111 via OR gate 112.

The second 2 to 1 arbiter selector 111 is used to select between the two inputs Dc and Dd under the control of inputs C and D.

The valid bit V1 is also used to select amongst the two arbiter selectors through means of multiplexer 113, in addition to forming an input to OR gate 114.

Figure 22:
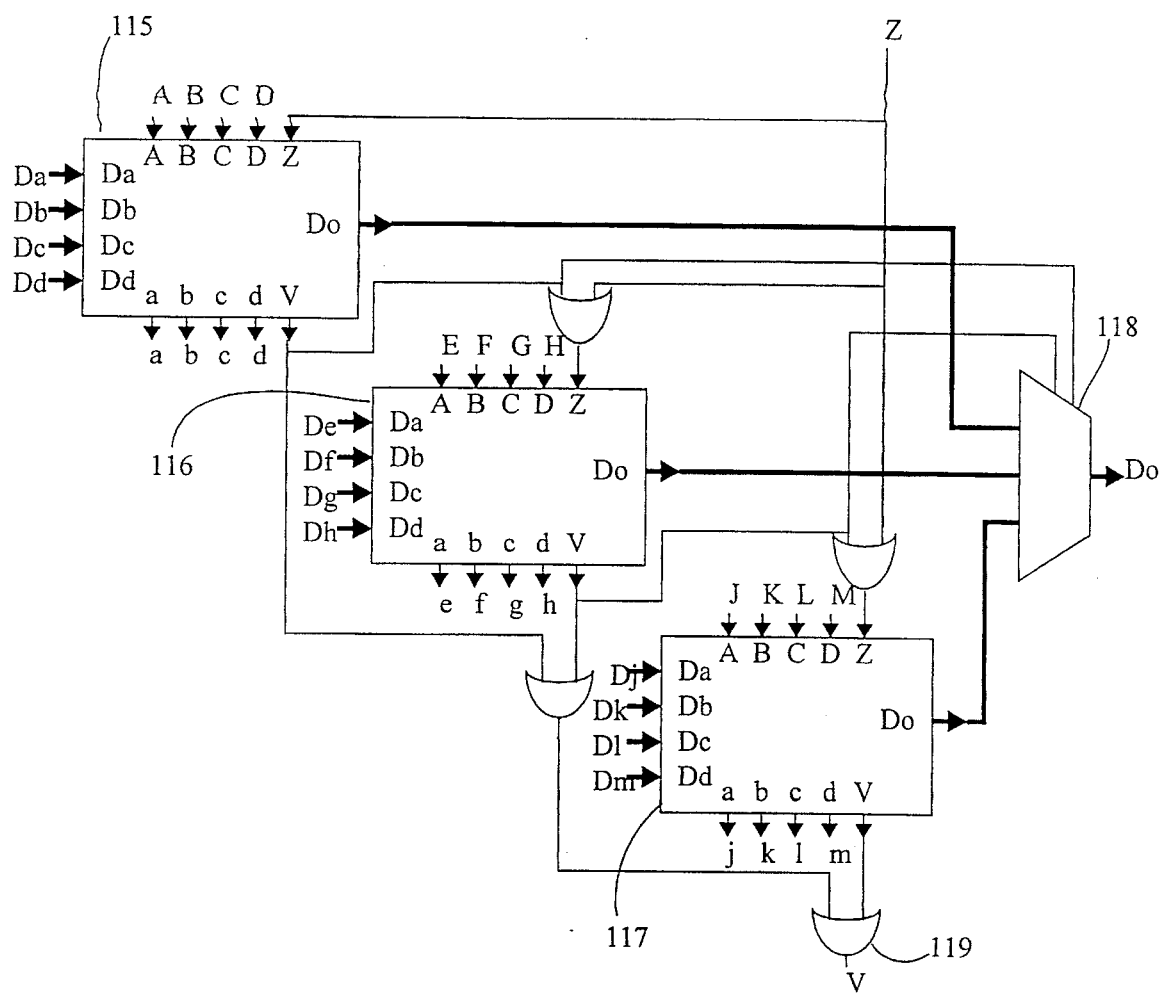
FIG. 22 is a schematic block diagram of the construction of a 12 to 1 arbiter selector of FIG. 18.

Referring now to FIG. 22 there is shown the construction of the 12 to 1 arbiter selector 97 from three 4 to 1 arbiter selectors 115, 116, 117, with each arbiter selector taking four of the inputs and four control signals. The outputs from each arbiter selector are fed to multiplexer 118 which selects one of the outputs depending on the valid output state of each arbiter selector. The valid outputs from each arbiter selector are fed to OR gate 119 to form the valid output of the 12 to 1 arbiter selector 97.

Referring again to FIG. 18, the 8 arbiter selectors are each fed the average signature inputs 94 and edge signature inputs 95 and choose the required outputs as determined by the state of input control signals 98.

The output of the 12 to 1 arbiter selector 97 is fed to 56-bit latch 96. The valid output 100 of the 12 to 1 arbiter selector 97 is used to enable 56-bit latch 96 and set a flip flop 102 to indicate that the 12 to 1 arbiter selector 97 has selected and latched its data. The output of the flip flop 102 is fed to the inhibit signal of the 12 to 1 arbiter selector 97 to stop it from selecting further input signatures. Additionally, the output is fed, with the outputs of the seven other flip-flops to AND gate 103 whose output in turn causes 56-bit latch 96 to output its data and all the flip flops to be reset.

A latch 104 is used to latch signatures that have not been selected in the current round by the arbiter selectors. These signals are then fed with the signals signifying the arrival of new signatures, input from the average signature generator and edge signature generator to an OR gate 105 to form the new set of input control signals 98 to the arbiter selectors.

Referring again to FIG. 3, it can be seen that the signature compare unit 120 takes, as its input, a current stream of signatures from the signature sequencer 93 in addition to corresponding signatures from a previous frame, input from edge signature inputs 95 and outputs priority values on motion detector output bus 25, in addition to storing the current signature stream in signature store 122 via signature store controller 121.

Figure 23:
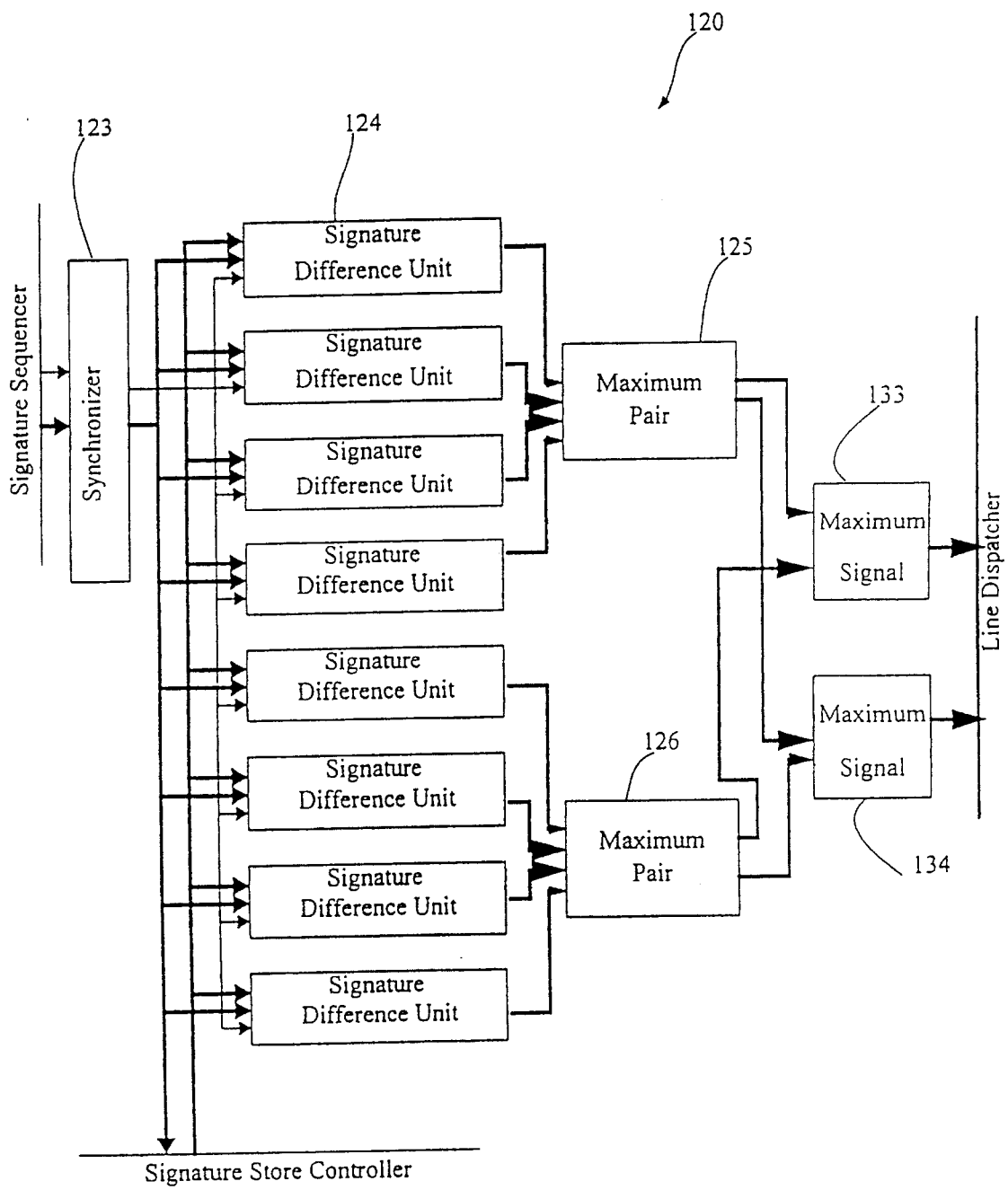
FIG. 23 is a schematic block diagram of the signature compare unit of FIG. 3.

Referring now to FIG. 23, there is shown the signature compare unit 120 in more detail. The signature compare unit 120 includes a synchronizer 123 which asynchronously latches incoming control and data signals from the signature sequencer 93 so that the rest of the signature compare unit 120 can work at the clock rate of the signature store controller 121. Of course, if the two clock rates are the same, the requirement for the synchronizer 123 is eliminated.

The signature streams are 56 bits wide, comprising 8 6-bit signatures in addition to an extra bit for each signature to indicate whether the signature is of an average or edge type. One signature is sent to each of eight signature difference units 124, in addition to being stored in the signature store 122 via signature store controller 121. Also forwarded to the signature difference units 124 are previous signatures from a previous frame read in from the signature store controller 121. The signature difference units 124 takes the absolute value of the difference between its two input signals and outputs this value to a maximum pair unit 125.

Figure 24:
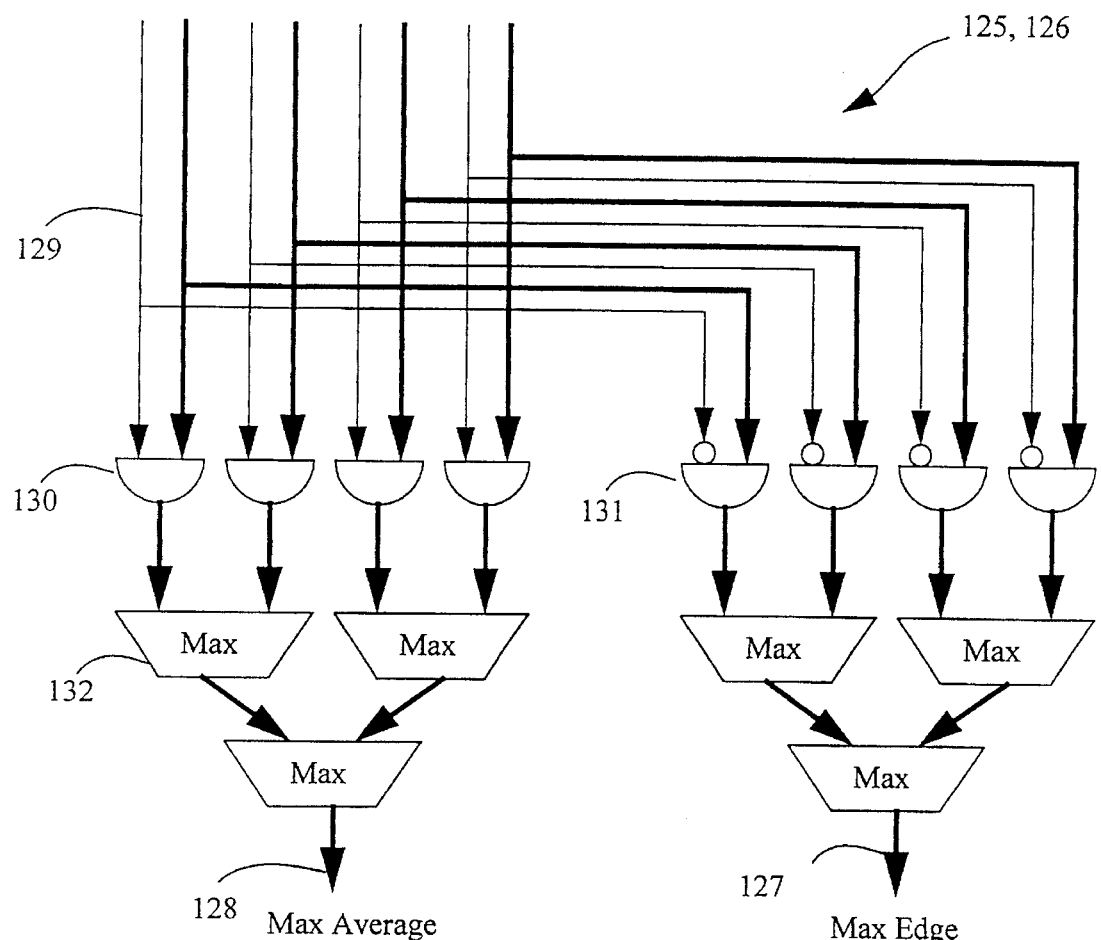
FIG. 24 is a schematic block diagram of the maximum pair unit of FIG. 23.

Referring now to FIG. 24, there is shown the maximum pair unit 125 in more detail. The maximum pair unit determines a maximum edge difference 127 and a maximum average difference 128 amongst the signature difference units. As each signature input to the maximum pair unit 125 contains a type bit 129, the two different types of signatures are extracted by means of AND gates e.g. 130, 131. Further processing by cascading two input maximum units 132 results in the maximum edge difference 127 and maximum average difference 128.

Referring again to FIG. 23, the output from the maximum pair unit 125 is fed, with the output from the other maximum pair unit 125, to one of two maximum signal units 125, 126. The maximum signal units are used to determine the maximum difference value for each line.

Figure 25:
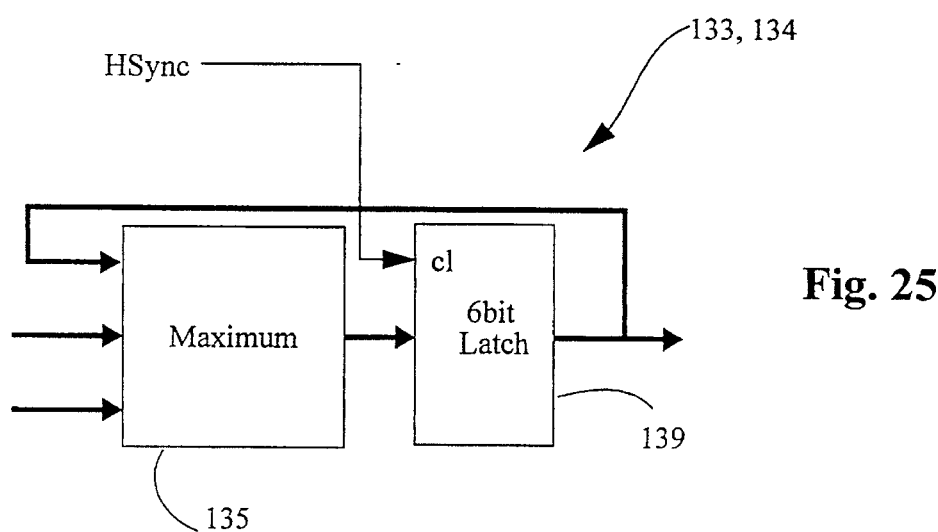
FIG. 25 is a schematic block diagram of the maximum signal unit of FIG. 23.

Referring now to FIG. 25, there is shown one of the maximum signal units 125, 126 in more detail. The maximum signal unit includes a 3 input maximum unit 135 which is similar to that described in FIG. 14 in addition to a latch 139. The 3 input maximum unit 135 and latch 139 determine a maximum priority value for each line with the output of the latch being fed back as one of the inputs of the 3 input maximum unit 135. The latch 139 is cleared by the Hsync signal at the end of each line.

After a scanline of signature has been compared the maximum difference for each type are output to the line dispatcher 15, and the output latches of the respective maximum signal unit 133, 134 are cleared.

Figure 26:
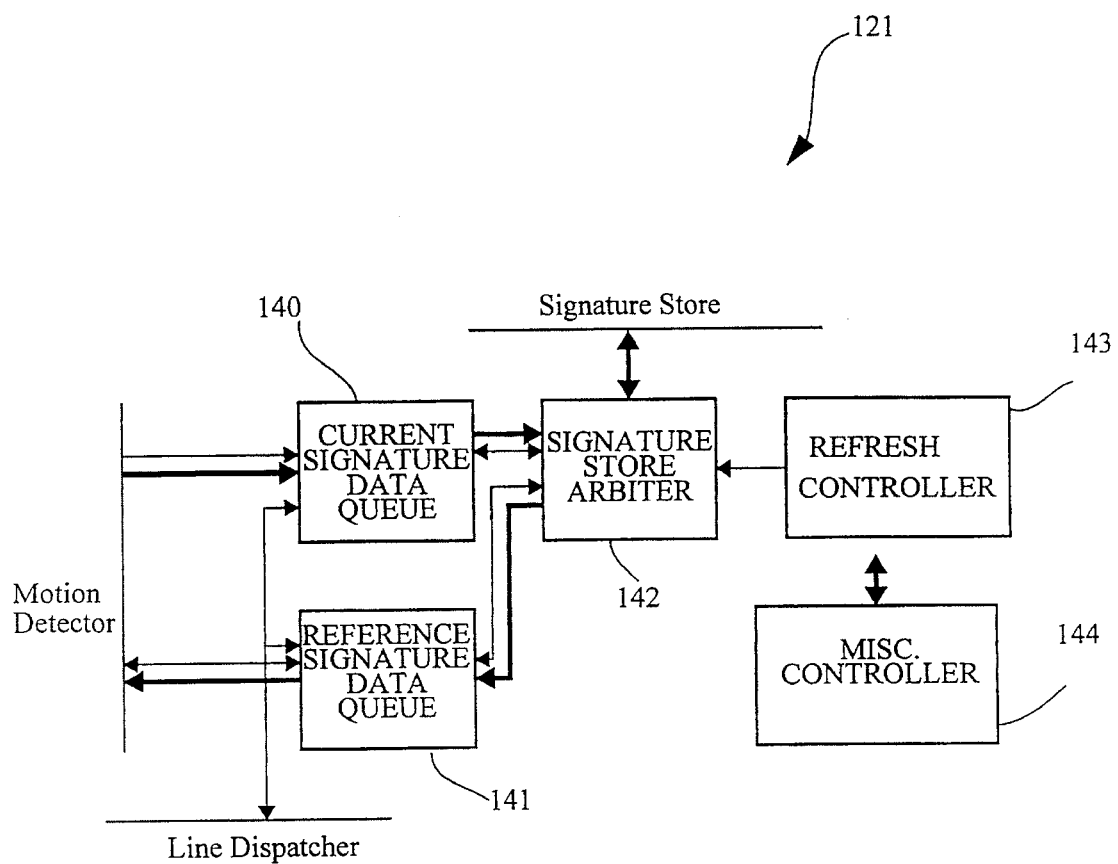
FIG. 26 is a schematic block diagram of the signature store controller of FIG. 3.

Referring now to FIG. 26, there is shown the signature store controller 121 in more detail. The signature store controller 121 is responsible for coordinating all access to the signature store 122 which is a DRAM array for storing previous flames' signatures. The signature store controller 121 consists of a current signature data queue 140, reference signature data queue 141, a signature store arbiter 142, a refresh controller 143 and a miscellaneous controller 144.

The signature store arbiter 142 is responsible for coordinating the contending requests for access to the signature store 122. Each of the contending modules, including current signature data queue 140, reference signature data queue 141, a signature store arbiter 142 and a refresh controller 143 assert a request signal when they require an access. The signature store arbiter 142 services the request, deasserts the request signal and asserts an acknowledge signal.

The current signature data queue 140 queues the current signatures that are written to the signature store 122 by the signature compare unit 120.

The reference signature data queue 141 queues the reference signatures that are read from the signature store 122 by the signature compare unit 120. The miscellaneous controller 144 generates the clock signal necessary to drive the signature store controller 121 and signature store 122.

The forgoing describes a system of detecting motion, especially in the presence of noise, through obtaining a measure of average signal intensity, and a measure of the difference in pixel values and comparing corresponding measures over time.

The foregoing describes only one embodiment of the present invention and modifications, obvious to those skilled in the art, can be made thereto without parting from the scope of the invention.

---

Appendix A

```
{Using a pseudo random number generator precalculate the
multiplication patterns and store them in the array 'patterns'.
Patterns are strings of weights. The weight values are −1,
1 and 2.
    'sums' is an array of three elements,
one for each of the red, green and blue average signature units
    'pixel' is a multidimensional array representing the input im-
age. This array stores a red, green and blue component of a pixel}
    read patterns
    for each L (line in image)
    begin
    for each S (segments in a line)
    begin
       initialise sums
       for each P (pixels in line)
       begin
          for each C (colour)
          begin
             sum[C] = sum[C]+
                pattern[P][C]*pixel[C][P][S][L]
          end (colour)
       end (pixels)
       store sums
    end (segments)
    end (lines)
```

---

Appendix B

```
{mask_patterns are strings of '0', '1' & '2'
    '0' means don't sample the edge
    '1' means sample the positive edge
    '2' means sample the negative edge
    These values are used as a mask to determine which bin
should sample the positive edge, and which bin should sample
the negative edge. For example, for a system with nine bins then,
for a current edge, the pattern 100000002 would mean that the
first bin samples the value of the positive edge and the ninth bin
samples the value of the last edge.
    There is a mask_patterns entry for each bin in
each colour mask_patterns are different on successive lines
but may repeat after n (>3) lines}
    read mask_patterns
    for each L (lines in image)
```

Appendix B -continued

```
    begin
    for each S (segments in line)
    begin
       initialize bins
       for each P (pixels in segment)
       begin
          for each C (colour)
          begin
    {for each set of pixels, determine the difference between
the two pixels and create two edges from this information}
             diff = pixel[P][C] − pixel[P+1][C]
             if diff>0 then
                slope_height[P][C][pos] = diff
                slope_height[P][C][neg] = 0
             else
                slope_height[P][C][pos] = 0
                slope_height[P][C][neg] = diff
          end (colour)
{assign the edge to its corresponding bin}
    for each B (bins)
    begin
             if mask_patterns[L][P][C][B] = 1 then
                bin[B][S] =
                   max(bin[B][S],step_height[P][C][pos])
             else
                if mask_patterns[L][P][C][B] = 2 then
                bin[B][S] =
                   max(bin[B][S],step_height[P][C][neg])
          end (pixels)
          store bins
       end (segments)
    end (lines)
```

---

Appendix C

```
    for each L (lines in image)
    begin
    max_edge = max_ave = 0
    for each S (current signature in line)
    begin
       fetch reference signature
       diff = abs(current signature − reference signature)
       if (current signature is average type) then
                max_ave = max(max_ave, diff)
       else
                max_edge = max(max_ave, diff)
       endif
    end (signature)
    dispatch max_ave, max_edge
    end (lines)
```

---

We claim:

1. An image processing apparatus comprising:
   a) input means for inputting image data having a plurality of lines and a plurality of pixels on each line;
   b) extracting means for extracting an average value from a plurality of pixels in a predetermined region;
   c) detecting means for detecting the motion of successively input images from the average value and a corresponding average value of a previous image; and
   d) determining means for determining the priority order of renewal of the plurality of lines which compose the input image data in accordance with an output of said detecting means.

2. An apparatus according to claim 1, wherein the image data is color image data.

3. An apparatus according to claim 1, further comprising display means for displaying the image data input by said input means in accordance with an output of said determining means.

4. An apparatus according to claim 3, wherein said display means uses a ferroelectric liquid crystal.

5. An image processing apparatus comprising:
 a) input means for inputting image data having a plurality of lines and a plurality of pixels on each line;
 b) extracting means for extracting an edge value from a plurality of pixels in a predetermined region;
 c) detecting means for detecting the motion of successively input images from the edge value and a corresponding edge value of a previous image; and
 d) determining means for determining the priority order of renewal of the plurality of lines which compose the input image data in accordance with an output of said detecting means.

6. An apparatus according to claim 5, wherein said detecting means includes means for determining a multitude of edge values between neighboring pixels of the predetermined region, means for determining a maximum edge value from the multitude of edge values and means for detecting the motion of successively input images from the maximum edge value and a corresponding maximum edge value of the previous image.

7. An apparatus according to claim 5, wherein the image data is color image data.

8. An apparatus according to claim 5, further comprising display means for displaying the image data input by said input means in accordance with an output of said determining means.

9. An apparatus according to claim 8, wherein said display means uses a ferroelectric liquid crystal.

* * * * *

UNITED STATES PATENT AND TRADEMARK OFFICE
CERTIFICATE OF CORRECTION

PATENT NO. : 5,561,476
DATED : October 1, 1996
INVENTOR(S) : Kershaw et al.

It is certified that error appears in the above-indentified patent and that said Letters Patent is hereby corrected as shown below:

On the title page, Item

[56] REFERENCES CITED:

U.S. PATENT DOCUMENTS, insert --3,553,361  1/1971   Mounts
                                3,553,362  1/1971   Mounts
                                5,349,344  10/1994  Inoue
                                5,436,636  7/1995   Nonoshita
                                5,481,319  1/1996   Kershaw--.

FOREIGN PATENT DOCUMENTS, "3118675  5/1991  Japan" should read --3-118675  5/1991  Japan--.

[57] ABSTRACT:

Line 6, "artifacts" should read --artifacts that one might observe--.

COLUMN 11:

Line 50, "0R gate" should read --OR gate--.

UNITED STATES PATENT AND TRADEMARK OFFICE
CERTIFICATE OF CORRECTION

PATENT NO. : 5,561,476
DATED : October 1, 1996
INVENTOR(S) : Kershaw et al.

It is certified that error appears in the above-indentified patent and that said Letters Patent is hereby corrected as shown below:

<u>COLUMN 13</u>:

Line 45, "pattern[P][C}*pixel" should read
--pattern[P][C]*pixel--.

Signed and Sealed this

Twentieth Day of May, 1997

BRUCE LEHMAN

*Attest:*

*Attesting Officer*          Commissioner of Patents and Trademarks